US010931985B2

(12) United States Patent
Hirabayashi et al.

(10) Patent No.: US 10,931,985 B2
(45) Date of Patent: Feb. 23, 2021

(54) INFORMATION PROCESSING APPARATUS AND INFORMATION PROCESSING METHOD

(71) Applicant: SONY CORPORATION, Tokyo (JP)

(72) Inventors: Mitsuhiro Hirabayashi, Tokyo (JP); Toru Chinen, Kanagawa (JP); Kouji Ogawa, Tokyo (JP); Osamu Shigeta, Ibaraki (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/465,282

(22) PCT Filed: Dec. 22, 2017

(86) PCT No.: PCT/JP2017/046165

§ 371 (c)(1),
(2) Date: May 30, 2019

(87) PCT Pub. No.: WO2018/128097

PCT Pub. Date: Jul. 12, 2018

(65) Prior Publication Data

US 2019/0394502 A1 Dec. 26, 2019

(30) Foreign Application Priority Data

Jan. 6, 2017 (JP) ............................ JP2017-001227

(51) Int. Cl.
*G06F 15/16* (2006.01)
*H04N 21/239* (2011.01)
(Continued)

(52) U.S. Cl.
CPC ....... *H04N 21/239* (2013.01); *H04L 65/4084* (2013.01); *H04L 67/2852* (2013.01); *H04N 21/2353* (2013.01); *H04N 21/258* (2013.01)

(58) Field of Classification Search
CPC . H04L 67/2852; H04L 65/80; H04L 65/4084; H04N 21/8456; H04N 21/2353;
(Continued)

(56) References Cited

U.S. PATENT DOCUMENTS

2014/0032849 A1 1/2014 De Vleeschauwer et al.
2014/0189772 A1 7/2014 Yamagishi et al.
(Continued)

FOREIGN PATENT DOCUMENTS

CN 103370709 A 10/2013
CN 104025604 A 9/2014
(Continued)

OTHER PUBLICATIONS

International Search Report and Written Opinion of PCT Application No. PCT/JP2017/046165, dated Mar. 13, 2018, 09 pages of ISRWO.

*Primary Examiner* — Cheikh T Ndiaye
(74) *Attorney, Agent, or Firm* — Chip Law Group

(57) ABSTRACT

The present technology relates to an information processing apparatus and an information processing method that enable construction of preference information of many users without special communication. In an information processing apparatus for managing content to be delivered to a plurality of other information processing apparatuses via a network, content information of content delivered in response to a request to a plurality of the other information processing apparatuses is acquired by an acquisition unit, and interest information of a plurality of the other information processing apparatuses is constructed by a construction unit on the basis of the acquired content information. The present technology is applicable to, in one example, a delivery system that delivers content from a server to terminal device via a network.

16 Claims, 34 Drawing Sheets

(51) Int. Cl.

| | |
|---|---|
| ***H04L 29/06*** | (2006.01) |
| ***H04L 29/08*** | (2006.01) |
| ***H04N 21/235*** | (2011.01) |
| ***H04N 21/258*** | (2011.01) |

(58) Field of Classification Search

CPC ............... H04N 21/258; H04N 21/239; H04N 21/23439; H04N 21/4728; H04N 21/252; G06F 13/00

See application file for complete search history.

(56) References Cited

U.S. PATENT DOCUMENTS

| | | | | |
|---|---|---|---|---|
| 2016/0014482 | A1* | 1/2016 | Chen | H04N 21/26258 386/241 |
| 2017/0220570 | A1* | 8/2017 | Tilaye | H04N 21/44218 |
| 2017/0316609 | A1* | 11/2017 | Dunn | G06T 19/006 |
| 2018/0077210 | A1* | 3/2018 | Hannuksela | H04L 65/4092 |

FOREIGN PATENT DOCUMENTS

| | | | |
|---|---|---|---|
| CN | 105379295 | A | 3/2016 |
| JP | 2014-511519 | A | 5/2014 |
| JP | 2015-213277 | A | 11/2015 |
| JP | 2016-533062 | A | 10/2016 |
| KR | 10-2013-0120509 | A | 11/2013 |
| WO | 2014/007083 | A1 | 1/2014 |
| WO | 2015/000936 | A1 | 1/2015 |

* cited by examiner

FIG. 7

DESCRIPTION USING SRD OF REGION A
<SupplementalProperty
schemeIdUri="urn:mpeg:dash:srd:20
14" value="0,0,0,1,1,2,2"/>
REGION B
<SupplementalProperty
schemeIdUri="urn:mpeg:dash:srd:20
14" value="0,1,0,1,1,2,2"/>
REGION C
<SupplementalProperty
schemeIdUri="urn:mpeg:dash:srd:20
14" value="0,0,1,1,1,2,2"/>
REGION D
<SupplementalProperty
schemeIdUri="urn:mpeg:dash:srd:20
14" value="0,1,1,1,1,2,2"/>

FIG. 8

| | T=0s | T=2s | T=4s | T=6s | T=8s | T=10s | T=12s | … |
|---|---|---|---|---|---|---|---|---|
| REGION A | Segment_a_1. mp4 | Segment_a_2. mp4 | Segment_a_3. mp4 | Segment_a_4. mp4 | Segment_a_5. mp4 | Segment_a_6. mp4 | Segment_a_7. mp4 | |
| REGION B | Segment_b_1. mp4 | Segment_b_2. mp4 | Segment_b_3. mp4 | Segment_b_4. mp4 | Segment_b_5. mp4 | Segment_b_6. mp4 | Segment_b_7. mp4 | |
| REGION C | Segment_c_1. mp4 | Segment_c_2. mp4 | Segment_c_3. mp4 | Segment_c_4. mp4 | Segment_c_5. mp4 | Segment_c_6. mp4 | Segment_c_7. mp4 | |
| REGION D | Segment_d_1. mp4 | Segment_d_2. mp4 | Segment_d_3. mp4 | Segment_d_4. mp4 | Segment_d_5. mp4 | Segment_d_6. mp4 | Segment_d_7. mp4 | |

FIG. 9

```
<?xml version="1.0" encoding="UTF-8"?>
<MPD
  xmlns="urn:mpeg:dash:schema:mpd:2011"
  type="dynamic"
  availabilityStartTime="NOW"
  minimumUpdatePeriod="PT10S"
  minBufferTime="PT1S"
  profiles="urn:mpeg:dash:profile:live:2011"
  [...]>
  <BaseURL>http://cdn1.example.com/</BaseURL>


  <Period>
    <!-tile A -->
    <AdaptationSet
      mimeType="video/mp4"
      codecs="avc1.4D401F"
      frameRate="30000/1001"
      segmentAlignment="true"
      startWithSAP="1">
      <BaseURL>video/</BaseURL>
      <SegmentTemplate
     initialization="$Bandwidth%/init.mp4"
     media="$Bandwidth%/Segment_a_$Number$.mp4"
     duration="2"/>
     <EssentialProperty schemeIdUri="urn:mpeg:dash:srd:2014"
         value="0, 0, 0, 1, 1, 2, 2"/>
     <Representation id="1" bandwidth="5000000">
     </Representation>
    </AdaptationSet>

    <!-tile B -->
    <AdaptationSet
     mimeType="video/mp4"
      codecs="avc1.4D401F"
      frameRate="30000/1001"
      segmentAlignment="true"
      startWithSAP="1">
      <BaseURL>video/</BaseURL>
     <SegmentTemplate
     initialization="$Bandwidth%/init.mp4"
     media="$Bandwidth%/Segment_b_$Number$.mp4"
     duration="2"/>
     <EssentialProperty schemeIdUri="urn:mpeg:dash:srd:2014"
         value="0, 1, 0, 1, 1, 2, 2"/>
     <Representation id="2" bandwidth="5000000">
     </Representation>
    </AdaptationSet>
```

FIG. 10

```
    <!-tile C -->
    <AdaptationSet
      mimeType="video/mp4"
      codecs="avc1.4D401F"
      frameRate="30000/1001"
      segmentAlignment="true"
      startWithSAP="1">
      <BaseURL>video/</BaseURL>
     <SegmentTemplate
     initialization="$Bandwidth%/init.mp4"
     media="$Bandwidth%/Segment_c_$Number$.mp4"
     duration="2"/>
     <EssentialProperty schemeIdUri="urn:mpeg:dash:srd:2014"
          value="0, 0, 1, 1, 1, 2, 2"/>
     <Representation id="3" bandwidth="5000000">
     </Representation>
    </AdaptationSet>

    <!-tile D -->
    <AdaptationSet
      mimeType="video/mp4"
      codecs="avc1.4D401F"
      frameRate="30000/1001"
      segmentAlignment="true"
      startWithSAP="1">
      <BaseURL>video/</BaseURL>
     <SegmentTemplate
     initialization="$Bandwidth%/init.mp4"
     media="$Bandwidth%/Segment_d_$Number$.mp4"
     duration="2"/>
     <EssentialProperty schemeIdUri="urn:mpeg:dash:srd:2014"
          value="0, 1, 1, 1, 1, 2, 2"/>
     <Representation id="4" bandwidth="5000000">
     </Representation>
    </AdaptationSet>

    </Period>
</MPD>
```

FIG. 11

```
<?xml version="1.0" encoding="UTF-8"?>
<MPD
  xmlns="urn:mpeg:dash:schema:mpd:2011"
  type="dynamic"
  availabilityStartTime="NOW"
  minimumUpdatePeriod="PT10S"
  minBufferTime="PT1S"
  profiles="urn:mpeg:dash:profile:live:2011"
  [...]>
  <BaseURL>http://cdn1.example.com/</BaseURL>


  <Period>
    <!-tile A -->
    <AdaptationSet
      mimeType="video/mp4"
      codecs="avc1.4D401F"
      frameRate="30000/1001"
      segmentAlignment="true"
      startWithSAP="1">
      <BaseURL>video/</BaseURL>
      <SegmentTemplate
     initialization="$Bandwidth%/init.mp4"
     media="$Bandwidth%/Segment_a_$Number$.mp4"
     duration="2"/>
     <EssentialProperty schemeIdUri="urn:mpeg:dash:srd:2014"
         value="0, 0, 0, 1920, 1080, 3840, 2160"/>
     <Representation id="1" bandwidth="5000000">
     </Representation>
    </AdaptationSet>

    <!-tile B -->
    <AdaptationSet
     mimeType="video/mp4"
      codecs="avc1.4D401F"
      frameRate="30000/1001"
      segmentAlignment="true"
      startWithSAP="1">
      <BaseURL>video/</BaseURL>
     <SegmentTemplate
     initialization="$Bandwidth%/init.mp4"
     media="$Bandwidth%/Segment_b_$Number$.mp4"
     duration="2"/>
     <EssentialProperty schemeIdUri="urn:mpeg:dash:srd:2014"
          value="0, 1920, 0, 1920, 1080, 3840, 2160"/>
     <Representation id="2" bandwidth="5000000">
     </Representation>
    </AdaptationSet>
```

FIG. 12

```
    <!--tile C -->
    <AdaptationSet
      mimeType="video/mp4"
      codecs="avc1.4D401F"
      frameRate="30000/1001"
      segmentAlignment="true"
      startWithSAP="1">
      <BaseURL>video/</BaseURL>
     <SegmentTemplate
     initialization="$Bandwidth%/init.mp4"
     media="$Bandwidth%/Segment_c_$Number$.mp4"
     duration="2"/>
     <EssentialProperty schemeIdUri="urn:mpeg:dash:srd:2014"
          value="0, 0, 1080, 1920, 1080, 3840, 2160"/>
     <Representation id="3" bandwidth="5000000">
     </Representation>
    </AdaptationSet>

    <!--tile D -->
    <AdaptationSet
     mimeType="video/mp4"
      codecs="avc1.4D401F"
      frameRate="30000/1001"
      segmentAlignment="true"
      startWithSAP="1">
      <BaseURL>video/</BaseURL>
     <SegmentTemplate
     initialization="$Bandwidth%/init.mp4"
     media="$Bandwidth%/Segment_d_$Number$.mp4"
     duration="2"/>
     <EssentialProperty schemeIdUri="urn:mpeg:dash:srd:2014"
          value="0, 1920, 1080, 1920, 1080, 3840, 2160"/>
     <Representation id="4" bandwidth="5000000">
     </Representation>
    </AdaptationSet>

    </Period>
</MPD>
```

FIG. 14

```
<?xml version="1.0" encoding="UTF-8"?>
<MPD
  xmlns="urn:mpeg:dash:schema:mpd:2011"
  type="dynamic"
  availabilityStartTime="NOW"
  minimumUpdatePeriod="PT10S"
  minBufferTime="PT1S"
  profiles="urn:mpeg:dash:profile:live:2011"
  [...]>
  <BaseURL>http://cdn1.example.com/</BaseURL>


  <Period>
    <!-tile A -->
    <AdaptationSet
      mimeType="video/mp4"
      codecs="avc1.4D401F"
      frameRate="30000/1001"
      segmentAlignment="true"
      startWithSAP="1">
      <BaseURL>video/</BaseURL>
      <SegmentTemplate
     initialization="$Bandwidth%/init.mp4"
     media="$Bandwidth%/Segment_a_$Number$.mp4"
     duration="2"/>
     <EssentialProperty schemeIdUri="urn:mpeg:dash:srd:2014"
         value="0, 0, 0, 1, 1, 4, 4"/>
     <EssentialProperty schemeIdUri="urn:mpeg:dash:coordinates:201X"
         value="equirectangular"/>

     <Representation id="1" bandwidth="5000000">
     </Representation>
    </AdaptationSet>

    <!-tile B -->
    <AdaptationSet
     mimeType="video/mp4"
      codecs="avc1.4D401F"
      frameRate="30000/1001"
      segmentAlignment="true"
      startWithSAP="1">
      <BaseURL>video/</BaseURL>
     <SegmentTemplate
     initialization="$Bandwidth%/init.mp4"
     media="$Bandwidth%/Segment_b_$Number$.mp4"
     duration="2"/>
     <EssentialProperty schemeIdUri="urn:mpeg:dash:srd:2014"
          value="0, 1, 0, 1, 1, 4, 4"/>
     <EssentialProperty schemeIdUri="urn:mpeg:dash:coordinates:201X"
          value="equirectangular"/>

     <Representation id="2" bandwidth="5000000">
     </Representation>
    </AdaptationSet>
```

FIG. 15

```
<!-tile C -->
<AdaptationSet
  mimeType="video/mp4"
  codecs="avc1.4D401F"
  frameRate="30000/1001"
  segmentAlignment="true"
  startWithSAP="1">
  <BaseURL>video/</BaseURL>
 <SegmentTemplate
 initialization="$Bandwidth%/init.mp4"
 media="$Bandwidth%/Segment_c_$Number$.mp4"
 duration="2"/>
 <EssentialProperty schemeIdUri="urn:mpeg:dash:srd:2014"
      value="0, 2, 0, 1, 1, 4, 4"/>
 <EssentialProperty schemeIdUri="urn:mpeg:dash:coordinates:201X"
      value="equirectangular"/>

 <Representation id="3" bandwidth="5000000">
 </Representation>
</AdaptationSet>

<!-tile D -->
<AdaptationSet
 mimeType="video/mp4"
  codecs="avc1.4D401F"
  frameRate="30000/1001"
  segmentAlignment="true"
  startWithSAP="1">
  <BaseURL>video/</BaseURL>
 <SegmentTemplate
 initialization="$Bandwidth%/init.mp4"
 media="$Bandwidth%/Segment_d_$Number$.mp4"
 duration="2"/>
 <EssentialProperty schemeIdUri="urn:mpeg:dash:srd:2014"
      value="0, 3, 0, 1, 1, 4, 4"/>
 <EssentialProperty schemeIdUri="urn:mpeg:dash:coordinates:201X"
      value="equirectangular"/>

 <Representation id="4" bandwidth="5000000">
 </Representation>
</AdaptationSet>
         ⋮
```

FIG. 16

```
    <!--tile P -->
    <AdaptationSet
     mimeType="video/mp4"
      codecs="avc1.4D401F"
      frameRate="30000/1001"
      segmentAlignment="true"
      startWithSAP="1">
      <BaseURL>video/</BaseURL>
     <SegmentTemplate
     initialization="$Bandwidth%/init.mp4"
     media="$Bandwidth%/Segment_p_$Number$.mp4"
     duration="2"/>
     <EssentialProperty schemeIdUri="urn:mpeg:dash:srd:2014"
          value="0, 3, 3, 1, 1, 4, 4"/>
     <EssentialProperty schemeIdUri="urn:mpeg:dash:coordinates:201X"
          value="equirectangular"/>

     <Representation id="4" bandwidth="5000000">
     </Representation>
    </AdaptationSet>


    </Period>
</MPD>
```

FIG. 20

| | T=0s | T=2s | T=4s | T=6s | T=8s | T=10s | T=12s | ... |
|---|---|---|---|---|---|---|---|---|
| REGION A | Segment_a_1.mp4 =10 | Segment_a_2.mp4 =10 | Segment_a_3.mp4 =100 | Segment_a_4.mp4 =100 | Segment_a_5.mp4 =10 | Segment_a_6.mp4 =10 | Segment_a_7.mp4 =10 | |
| REGION B | Segment_b_1.mp4 =100 | Segment_b_2.mp4 =10 | Segment_b_3.mp4 =10 | Segment_b_4.mp4 =10 | Segment_b_5.mp4 =100 | Segment_b_6.mp4 =100 | Segment_b_7.mp4 =10 | |
| REGION C | Segment_c_1.mp4 =10 | Segment_c_2.mp4 =100 | Segment_c_3.mp4 =10 | Segment_c_4.mp4 =10 | Segment_c_5.mp4 =10 | Segment_c_6.mp4 =10 | Segment_c_7.mp4 =10 | |
| REGION D | Segment_d_1.mp4 =10 | Segment_d_2.mp4 =10 | Segment_d_3.mp4 =10 | Segment_d_4.mp4 =10 | Segment_d_5.mp4 =10 | Segment_d_6.mp4 =10 | Segment_d_7.mp4 =100 | |

FIG. 21

| | T=0s | T=2s | T=4s | T=6s | T=8s | T=10s | T=12s | … |
|---|---|---|---|---|---|---|---|---|
| REGION A | 10 | 10 | 100 | 100 | 10 | 10 | 10 | |
| REGION B | 100 | 10 | 10 | 10 | 100 | 100 | 10 | |
| REGION C | 10 | 100 | 10 | 10 | 10 | 10 | 10 | |
| REGION D | 10 | 10 | 10 | 10 | 10 | 10 | 100 | |

FIG. 24

| | T=0s | T=2s | T=4s | T=6s | T=8s | T=10s | T=12s | ... |
|---|---|---|---|---|---|---|---|---|
| REGION A | Segment_a_1.mp4=10 | Segment_a_2.mp4=10 | Segment_a_3.mp4=100 | Segment_a_4.mp4=100 | Segment_a_5.mp4=10 | Segment_a_6.mp4=10 | Segment_a_7.mp4=10 | |
| REGION B | Segment_b_1.mp4=100 | Segment_b_2.mp4=10 | Segment_b_3.mp4=10 | Segment_b_4.mp4=10 | Segment_b_5.mp4=100 | Segment_b_6.mp4=100 | Segment_b_7.mp4=10 | |
| REGION C | Segment_c_1.mp4=10 | Segment_c_2.mp4=100 | Segment_c_3.mp4=10 | Segment_c_4.mp4=10 | Segment_c_5.mp4=10 | Segment_c_6.mp4=10 | Segment_c_7.mp4=10 | |
| REGION D | Segment_d_1.mp4=10 | Segment_d_2.mp4=10 | Segment_d_3.mp4=10 | Segment_d_4.mp4=10 | Segment_d_5.mp4=10 | Segment_d_6.mp4=10 | Segment_d_7.mp4=100 | |

FIG. 25

| | T=0s | T=2s | T=4s | T=6s | T=8s | T=10s | T=12s | … | |
|---|---|---|---|---|---|---|---|---|---|
| REGION A | 10 | 10 | 100 | 100 | 10 | 10 | 10 | | |
| REGION B | 100 | 10 | 10 | 10 | 100 | 100 | 10 | | |
| REGION C | 10 | 100 | 10 | 10 | 10 | 10 | 10 | | |
| REGION D | 10 | 10 | 10 | 10 | 10 | 10 | 100 | | |

FIG. 28

```
<?xml version="1.0" encoding="UTF-8"?>
<MPD
  xmlns="urn:mpeg:dash:schema:mpd:2011"
  type="dynamic"
  availabilityStartTime="NOW"
  minimumUpdatePeriod="PT10S"
  minBufferTime="PT1S"
  profiles="urn:mpeg:dash:profile:live:2011"
  [...]>
  <BaseURL>http://cdn1.example.com/</BaseURL>


  <Period>
    <!-tile A -->
    <AdaptationSet
      mimeType="video/mp4"
      codecs="avc1.4D401F"
      frameRate="30000/1001"
      segmentAlignment="true"
      startWithSAP="1">
      <BaseURL>video/</BaseURL>
      <SegmentTemplate
     initialization="$Bandwidth%/init.mp4"
     media="$Bandwidth%/Segment_a_$Number$.mp4"
     duration="2"/>
     <EssentialProperty schemeIdUri="urn:mpeg:dash:srd:2014"
         value="0, 0, 0, 1, 1, 2, 2"/>
     <Representation id="1" bandwidth="5000000">
     </Representation>
    </AdaptationSet>

    <!-tile B -->
    <AdaptationSet
     mimeType="video/mp4"
      codecs="avc1.4D401F"
      frameRate="30000/1001"
      segmentAlignment="true"
      startWithSAP="1">
      <BaseURL>video/</BaseURL>
     <SegmentTemplate
     initialization="$Bandwidth%/init.mp4"
     media="$Bandwidth%/Segment_b_$Number$.mp4"
     duration="2"/>
     <EssentialProperty schemeIdUri="urn:mpeg:dash:srd:2014"
          value="0, 1, 0, 1, 1, 2, 2"/>
     <Representation id="2" bandwidth="5000000">
     </Representation>
    </AdaptationSet>
```

FIG. 29

```
    <!-tile C -->
    <AdaptationSet
      mimeType="video/mp4"
      codecs="avc1.4D401F"
      frameRate="30000/1001"
      segmentAlignment="true"
      startWithSAP="1">
      <BaseURL>video/</BaseURL>
     <SegmentTemplate
     initialization="$Bandwidth%/init.mp4"
     media="$Bandwidth%/Segment_c_$Number$.mp4"
     duration="2"/>
     <EssentialProperty schemeIdUri="urn:mpeg:dash:srd:2014"
          value="0, 0, 1, 1, 1, 2, 2"/>
     <Representation id="3" bandwidth="5000000">
     </Representation>
    </AdaptationSet>

    <!-tile D -->
    <AdaptationSet
     mimeType="video/mp4"
      codecs="avc1.4D401F"
      frameRate="30000/1001"
      segmentAlignment="true"
      startWithSAP="1">
      <BaseURL>video/</BaseURL>
     <SegmentTemplate
     initialization="$Bandwidth%/init.mp4"
     media="$Bandwidth%/Segment_d_$Number$.mp4"
     duration="2"/>
     <EssentialProperty schemeIdUri="urn:mpeg:dash:srd:2014"
          value="0, 1, 1, 1, 1, 2, 2"/>
     <Representation id="4" bandwidth="5000000">
     </Representation>
    </AdaptationSet>

   <!-Recommend -->
    <AdaptationSet
     mimeType="application/xml"
      codecs="meta"
      frameRate="30000/1001"
      segmentAlignment="true" >
     <Role schemeIdUri="urn:mpeg:dash:role:201X" value="recommend"/>
     <EssentialProperty schemeIdUri="urn:mpeg:dash:MPDupdate:201X"
             value="segment,true"/>

      <BaseURL>video/</BaseURL>
         <Representation id="5" bandwidth="10000"dependencyId="1,2,3,4">
      <BaseURL>segment_recommend.mp4</BaseURL>
         </Representation>
    </AdaptationSet>

    </Period>
</MPD>
```

FIG. 34

```
<?xml version="1.0" encoding="UTF-8"?>
<MPD
  xmlns="urn:mpeg:dash:schema:mpd:2011"
  type="dynamic"
  availabilityStartTime="NOW"
  minimumUpdatePeriod="PT10S"
  minBufferTime="PT1S"
  profiles="urn:mpeg:dash:profile:live:2011"
  [...]>
  <BaseURL>http://cdn1.example.com/</BaseURL>


  <Period>
    <!-tile A -->
    <AdaptationSet
      mimeType="video/mp4"
      codecs="avc1.4D401F"
      frameRate="30000/1001"
      segmentAlignment="true"
      startWithSAP="1">
      <BaseURL>video/</BaseURL>
      <SegmentTemplate
     initialization="$Bandwidth%/init.mp4"
     media="$Bandwidth%/Segment_a_$Number$.mp4"
     duration="2"/>
     <EssentialProperty schemeIdUri="urn:mpeg:dash:srd:2014"
         value="0, 0, 0, 1, 1, 2, 2"/>
     <Representation id="1" bandwidth="5000000">
     </Representation>
    </AdaptationSet>

    <!-tile B -->
    <AdaptationSet
     mimeType="video/mp4"
      codecs="avc1.4D401F"
      frameRate="30000/1001"
      segmentAlignment="true"
      startWithSAP="1">
      <BaseURL>video/</BaseURL>
     <SegmentTemplate
     initialization="$Bandwidth%/init.mp4"
     media="$Bandwidth%/Segment_b_$Number$.mp4"
     duration="2"/>
     <EssentialProperty schemeIdUri="urn:mpeg:dash:srd:2014"
          value="0, 1, 0, 1, 1, 2, 2"/>
     <Representation id="2" bandwidth="5000000">
     </Representation>
    </AdaptationSet>
```

FIG. 35

```
<!-tile C -->
<AdaptationSet
  mimeType="video/mp4"
  codecs="avc1.4D401F"
  frameRate="30000/1001"
  segmentAlignment="true"
  startWithSAP="1">
  <BaseURL>video/</BaseURL>
 <SegmentTemplate
 initialization="$Bandwidth%/init.mp4"
 media="$Bandwidth%/Segment_c_$Number$.mp4"
 duration="2"/>
 <EssentialProperty schemeIdUri="urn:mpeg:dash:srd:2014"
      value="0, 0, 1, 1, 1, 2, 2"/>
 <Representation id="3" bandwidth="5000000">
 </Representation>
</AdaptationSet>

<!-tile D -->
<AdaptationSet
 mimeType="video/mp4"
  codecs="avc1.4D401F"
  frameRate="30000/1001"
  segmentAlignment="true"
  startWithSAP="1">
  <BaseURL>video/</BaseURL>
 <SegmentTemplate
 initialization="$Bandwidth%/init.mp4"
 media="$Bandwidth%/Segment_d_$Number$.mp4"
 duration="2"/>
 <EssentialProperty schemeIdUri="urn:mpeg:dash:srd:2014"
      value="0, 1, 1, 1, 1, 2, 2"/>
 <Representation id="4" bandwidth="5000000">
 </Representation>
</AdaptationSet>

<!- Recommend -->
<AdaptationSet
 mimeType="application/xml"
  codecs="meta"
  frameRate="30000/1001"
  segmentAlignment="true" >
  <Role schemeIdUri="urn:mpeg:dash:role:201X" value="recommend"/>
  <BaseURL>video/</BaseURL>
     <Representation id="5" bandwidth="10000"dependencyId="1,2,3,4">
      <SegmentList duration="2">
        <SegmentURL media=" segment_b_1.mp4"/>
       <SegmentURL media=" segment_c_2.mp4"/>
       <SegmentURL media=" segment_a_3.mp4"/>
       <SegmentURL media=" segment_a_4.mp4"/>
       <SegmentURL media=" segment_b_5.mp4"/>
       <SegmentURL media=" segment_b_6.mp4"/>
       <SegmentURL media=" segment_d_7.mp4"/>
       .....

     </SegmentList>

     </Representation>
</AdaptationSet>

</Period>
</MPD>
```

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2017/046165 filed on Dec. 22, 2017, which claims priority benefit of Japanese Patent Application No. JP 2017-001227 filed in the Japan Patent Office on Jan. 6, 2017. Each of the above-referenced applications is hereby incorporated herein by reference in its entirety.

TECHNICAL FIELD

The present technology relates to an information processing apparatus and an information processing method, and more particularly to an information processing apparatus and information processing method enabling construction of preference information of many users without special communication.

BACKGROUND ART

In video with high resolution and wide viewing angle (panoramic image, virtual reality (VR) video, etc.), the actual viewing region may be sometimes a part of the content video. In order to transmit the video with highest quality suitable for the network band, it is known to segment video with high resolution and wide viewing angle into a plurality of streams for transmission (DASH SRD standard (ISO/IEC23009-1:2014/AMD2)).

In segmenting video into a plurality of streams for transmission, information of the entire video and information indicating the positional relationship between the segmented streams are transmitted. The terminal device requests the stream necessary for viewing by the user from a server on the basis of the pieces of information. The server transmits the requested stream to the terminal device and the terminal device displays it.

In a system that delivers such video with high resolution and wide viewing angle in the form of a plurality of segmented streams, the following technique has been developed. In other words, the terminal device receiving streams creates a viewing cumulative frequency table for viewers and transmits it to the server. The server adds up viewing histories of a plurality of viewers, creates the most frequent route, and recommends it to the viewers (e.g., Patent Literature 1).

CITATION LIST

Patent Literature

Patent Literature 1: JP 2013-183209A

DISCLOSURE OF INVENTION

Technical Problem

However, it is burdensome for the terminal device to create the viewing cumulative frequency table for viewers and transmit it to the server by special communication for that purpose. In addition, the network is congested accordingly.

The present technology is made in view of such a situation, and it is intended to be capable of constructing preference information of many users without special communication.

Solution to Problem

According to an aspect of the present technology, an information processing apparatus for managing content to be delivered to a plurality of other information processing apparatuses via a network, the information processing apparatus includes: an acquisition unit configured to acquire content information of the content delivered in response to a request to a plurality of the other information processing apparatuses; and a construction unit configured to construct interest information of a plurality of the other information processing apparatuses on the basis of the acquired content information.

The content information may be segment file information of a segment obtained by temporally segmenting the content.

The segment file information may include a URL of a relevant segment file and the number of times the segment file is delivered.

The interest information may include a time series of an interest region and the number of times the interest region is delivered.

The interest information may be constructed for each area.

The segment file information may be acquired at regular time intervals.

The interest region may be described using DASH SRD standard.

Recommendation information to be delivered to a plurality of the other information processing apparatuses may be generated on the basis of the interest information.

The recommendation information may be a time series of the interest region having a largest number of times of delivery.

The recommendation information may be described in a timed metadata track.

The recommendation information may be described in a segment list of an MPD file outputted from the information processing apparatus.

According to an aspect of the present technology, an information processing method executed by an information processing apparatus for managing content to be delivered to a plurality of other information processing apparatuses via a network, the information processing method includes: an acquisition step of acquiring content information of the content delivered in response to a request to a plurality of the other information processing apparatuses; and a construction step of constructing interest information of a plurality of the other information processing apparatuses on the basis of the acquired content information.

According to an aspect of the present technology, an information processing apparatus for managing content to be delivered to a plurality of other information processing apparatuses via a network, the information processing apparatus includes: an acquisition unit configured to acquire content information of the content delivered in response to a request to a plurality of the other information processing apparatuses; a construction unit configured to construct interest information of a plurality of the other information processing apparatuses on the basis of the acquired content information; and a generation unit configured to generate recommendation information to be delivered to a plurality of the other information processing apparatuses on the basis of the interest information.

According to an aspect of the present technology, an information processing method executed by an information processing apparatus for managing content to be delivered to a plurality of other information processing apparatuses via a network, the information processing method includes: an acquisition step of acquiring content information of the content delivered in response to a request to a plurality of the other information processing apparatuses; a construction step of constructing interest information of a plurality of the other information processing apparatuses on the basis of the acquired content information; and a generation step of generating recommendation information delivered to a plurality of the other information processing apparatuses on the basis of the interest information.

According to an aspect of the present technology, an information processing apparatus receiving delivery of content from another information processing apparatus via a network, the information processing apparatus includes: an acquisition unit configured to acquire, from the other information processing apparatus, recommendation information generated on the basis of content information of the content requested from the other information processing apparatus and delivered by the other information processing apparatus; and a playback unit configured to perform playback on the basis of the recommendation information.

According to an aspect of the present technology, an information processing method executed by an information processing apparatus receiving delivery of content from another information processing apparatus via a network, the information processing method includes: an acquisition step of acquiring, from the other information processing apparatus, recommendation information generated on a basis of content information of the content requested from the other information processing apparatus and delivered by the other information processing apparatus; and a playback step of performing playback on the basis of the recommendation information.

According to an aspect of the present technology, an information processing apparatus for managing content to be delivered to a plurality of other information processing apparatuses via a network, in which content information of the content delivered in response to a request to a plurality of the other information processing apparatuses is acquired; and interest information of a plurality of the other information processing apparatuses is constructed on the basis of the acquired content information.

Advantageous Effects of Invention

According to one feature of the present technology as described above, it is possible to construct preference information of many users without special communication. Moreover, the advantageous effects described herein are merely examples and are not limited thereto, and additional effects may be provided.

BRIEF DESCRIPTION OF DRAWINGS

FIG. 7 is a diagram illustrating an example of description using SRD.

FIG. 8 is a diagram illustrated to describe arrangement of segmented files.

FIG. 9 is a diagram illustrating an example of an MPD file.

FIG. 10 is a diagram illustrating an example of the MPD file following FIG. 9.

FIG. 11 is a diagram illustrating an example of an MPD file.

FIG. 12 is a diagram illustrating an example of the MPD file following FIG. 11.

FIG. 14 is a diagram illustrating an example of an MPD file.

FIG. 15 is a diagram illustrating an example of the MPD file following FIG. 14.

FIG. 16 is a diagram illustrating an example of the MPD file following FIG. 15.

FIG. 20 is a diagram illustrating an example of interest information of content.

FIG. 21 is a diagram illustrating an example of interest information of content.

FIG. 24 is a diagram illustrating an example of recommendation information of content.

FIG. 25 is a diagram illustrating an example of recommendation information of content.

FIG. 28 is a diagram illustrating an example of an MPD file.

FIG. 29 is a diagram illustrating an example of the MPD file following FIG. 28.

FIG. 34 is a diagram illustrating an example of an MPD file.

FIG. 35 is a diagram illustrating an example of the MPD file following FIG. 28.

MODE(S) FOR CARRYING OUT THE INVENTION

Embodiments for carrying out the present technology are now described. Moreover, the description is given in the following order.

1. Example of tile-based streaming (FIG. 1)
2. First embodiment
   (1) Configuration of delivery system (FIGS. 2 to 16)
   (2) Content delivery processing in delivery system (FIGS. 17 to 21)
3. Second embodiment
   Recommendation delivery processing in delivery system (FIGS. 22 to 35)
4. Description for computer to which present disclosure is applied (FIG. 36)
5. Other <Example of Tile-Based Streaming (FIG. 1)>

Figure 1:
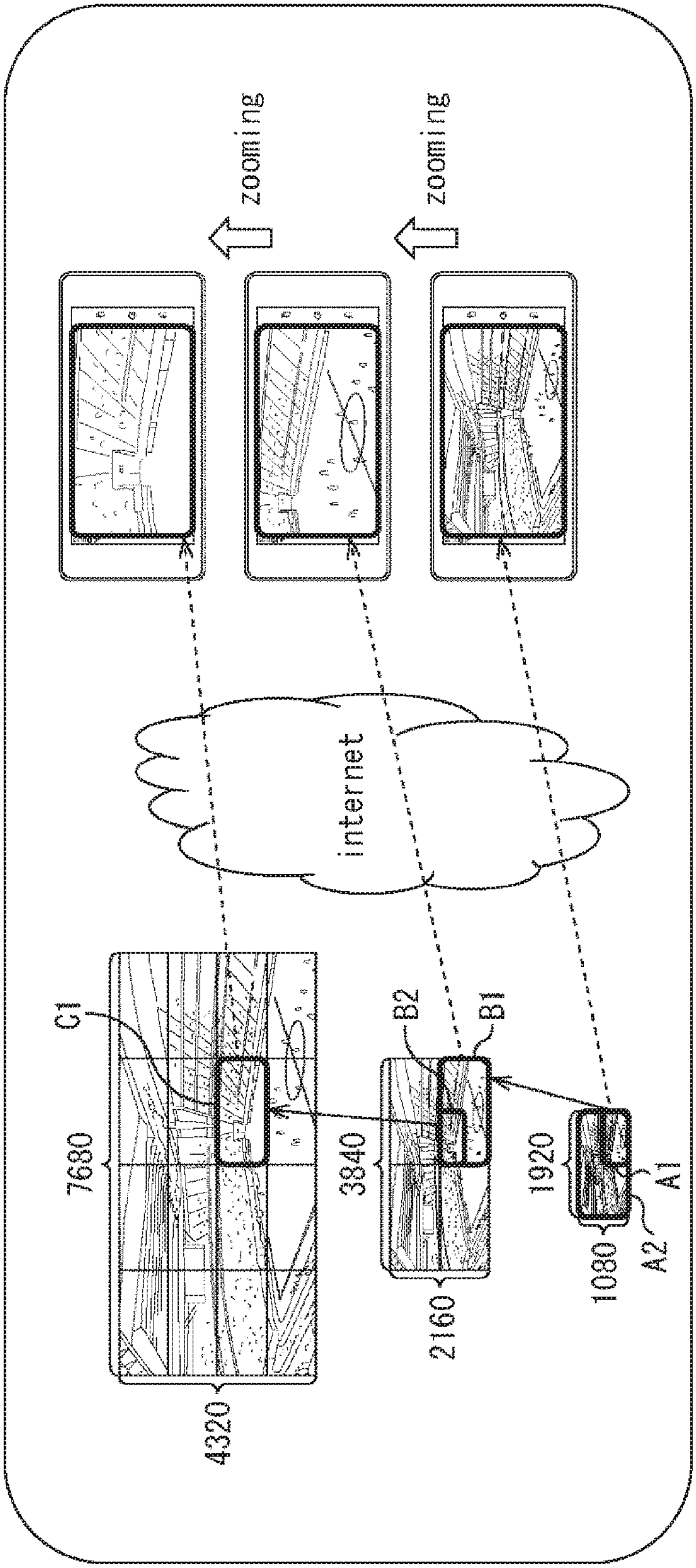
FIG. 1 is a diagram illustrated to describe tile-based streaming.

The present technology employs tile-based streaming, so an example of tile-based streaming is now described. FIG. 1 is a diagram illustrated to describe tile-based streaming.

In the example of FIG. 1, on the left side, 8 k (7680×4320 pixels) image, 4 k (3840×2160 pixels) image, and high-definition (HD) (1920×1080) image illustrated sequentially from the top show that the number of their pixels is different from each other. The 8 k image is segmented into 4×3 regions (tiles), and 4 k and HD images are segmented into 2×2 regions. One segmented region of the HD image is A1, one segmented region of 4 k image is B1, and one segmented region of the 8 k image is C1. The viewing range of the segmented region A1 in the entire region A2 of the HD image corresponds to the viewing range of the segmented region B1 of the 4 k image. The viewing range of a region B2 in the segmented region B1 of the 4 k image corresponds to the viewing range of the segmented region C1 of the 8 k image.

The right side of FIG. 1 shows the state of zooming on one display screen. In a case of viewing a region A11 of the HD image (corresponding to the region A2 of the HD image on the left side), the zooming of it allows an image of a region B11 to be displayed. In other words, the image of the segmented region B1 of the 4 k on the left side is enlarged and displayed. The further zooming allows the image of the segmented region C1 of 8 k on the left side to be enlarged and displayed as the image of a region C11.

According to DASH SRD standard (ISO/IEC 23009-1: 2014 AMD2) (DASH: Dynamic Adaptive Streaming over HTTP, SRD: Spatial Relationship Description), it is possible to perform zooming for an image with high resolution and wide viewing angle. Then, the viewer is able to specify an image of the interest region of a part of the entire image with the wide viewing angle and to view it as a clear image with high resolution.

First Embodiment

<Configuration of Delivery System (FIGS. 2 to 16)>

Figure 2:
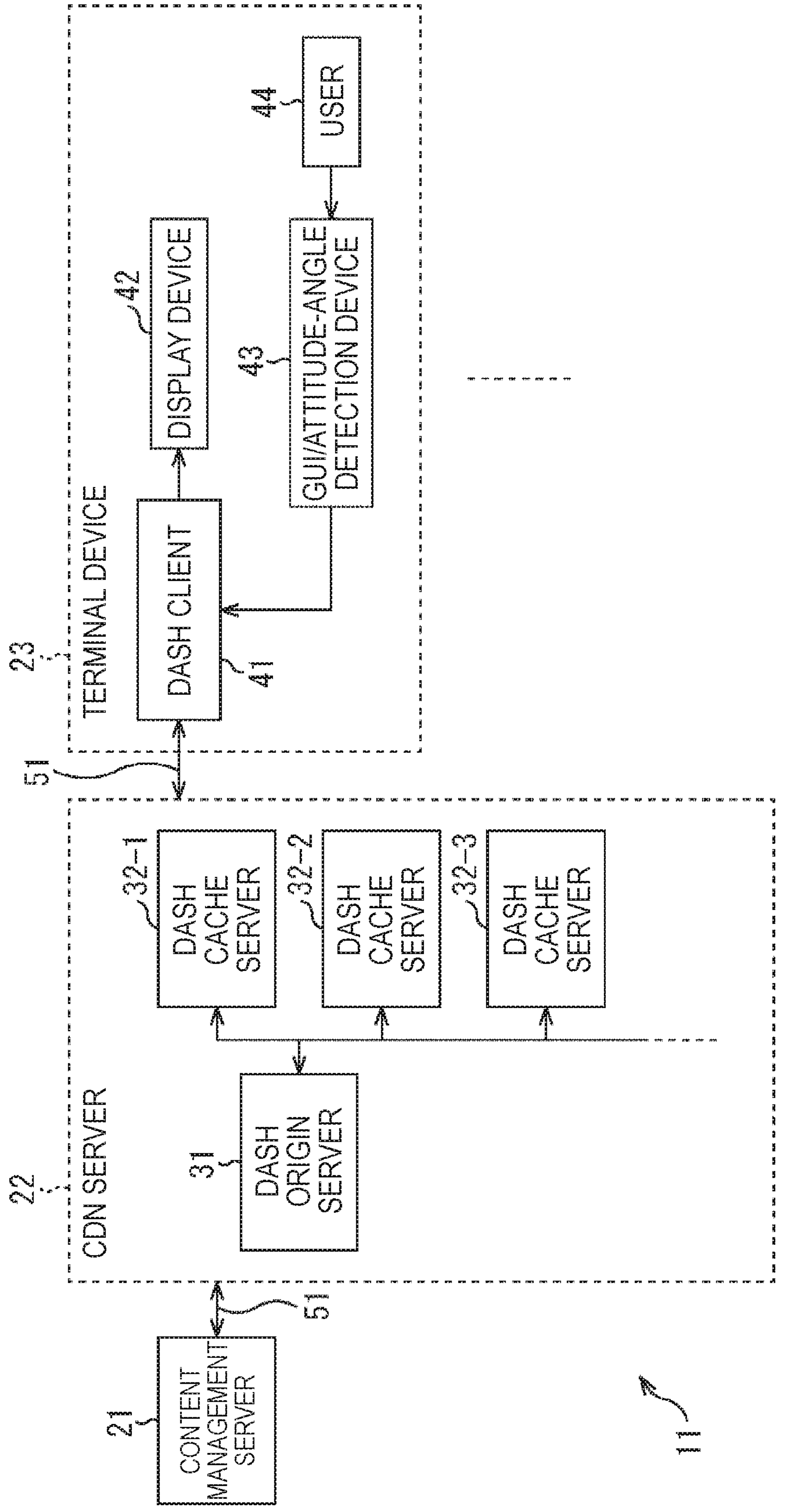
FIG. 2 is a block diagram illustrating a configuration of a delivery system.

FIG. 2 is a block diagram illustrating the configuration of a delivery system. The delivery system 11 includes 21, a content delivery network (CDN) server 22, and a terminal device 23, which are all the information processing apparatus. They are mutually connected to each other via a network 51 represented by the Internet.

In FIG. 2, only one CDN server 22 and one terminal device 23 are shown, but actually, a plurality of terminal devices 23 is connected to one CDN server 22. A plurality of CDN servers 22 is also capable being connected to one content management server 21.

The CDN server 22 includes a DASH origin server 31 and a plurality of DASH cache servers 32-1, 32-2, 32-3, etc. connected thereto via the network 51. These are also information processing apparatuses. Moreover, in a case where there is no need to distinguish between the DASH cache servers 32-1, 32-2, 32-3, etc., individually, they are hereinafter simply described as a DASH cache server 32.

The content management server 21 holds content and manages the entire system. The DASH cache server 32 supplies the content to the terminal device 23 in response to a request from the terminal device 23. In a case where the DASH cache server 32 does not hold the content requested from the terminal device 23, the DASH cache server 32 requests it from the DASH origin server 31, receives and holds it supplied therefrom, and delivers it to the terminal device 23. The DASH origin server 31 receives and holds the content supplied from the content management server 21.

The terminal device 23 acting as a client includes a DASH client 41, a display device 42, and a graphical user interface (GUI)/attitude angle detection device 43 used by a user 44. The DASH client 41 requests the content necessary from the DASH cache server 32 and supplies the acquired content to the display device 23 for displaying it.

The display device 42 includes, in one example, a head-mounted display (HMD), a television receiver, or the like. The GUI/attitude-angle detection device 43 detects an interest region of the user 44 from a remote controller, an operation on the screen, movement of viewpoint, head's movement by the user 44, and supplies the detection result to the DASH client 41. The DASH client 41 selects the image of the interest region specified by the user 44 and supplies it to the display device 42 for displaying it.

Moreover, the content management server 21 and the CDN server 22 can be integrally configured.

Figure 3:
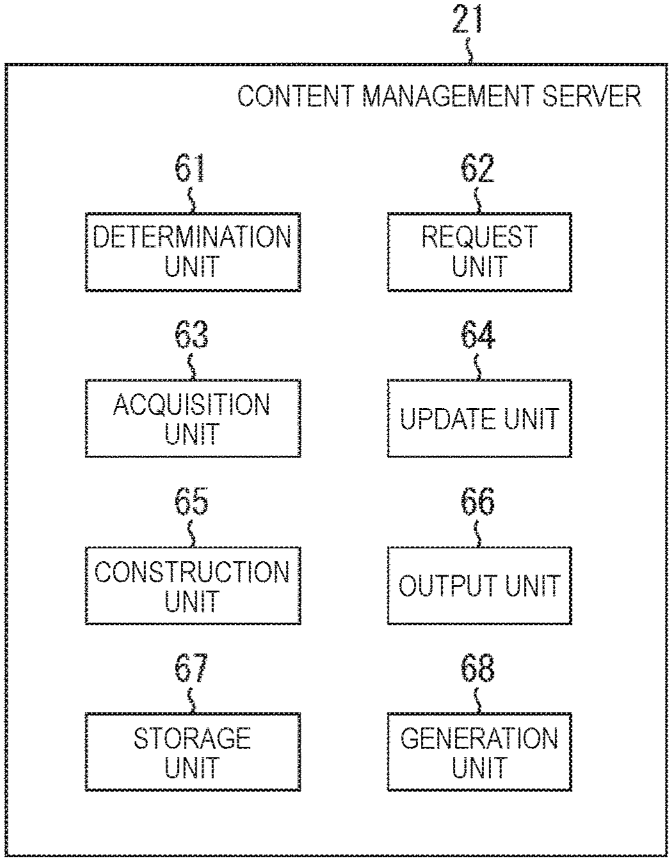
FIG. 3 is a block diagram illustrating a configuration of a content management server.

FIG. 3 is a block diagram illustrating the configuration of the content management server. The content management server 21 includes functional blocks of a determination unit 61, a request unit 62, an acquisition unit 63, an update unit 64, a construction unit 65, an output unit 66, a storage unit 67, and a generation unit 68.

The determination unit 61 performs various types of determination processing such as whether or not a predetermined time is reached. The request unit 62 makes various requests such as requesting segment file information from the DASH cache server 32. The acquisition unit 63 performs acquisition of various types of information such as receiving segment file information and acquiring interest information. The update unit 64 performs various types of updating processing such as updating segment file information, updating contents of timed metadata, updating contents of segment list, or the like. The construction unit 65 constructs interest information of content. The construction unit 65 also generates, as recommendation information, recommended timed metadata or recommended segment list. The output unit 66 performs output of various types of information such as uploading timed metadata file and MPD file. The storage unit 67 stores the content interest information, the recommended timed metadata, the recommended segment list, or the like, in addition to content to be supplied to the DASH origin server 31. The generation unit generates the recommendation information.

Figure 4:
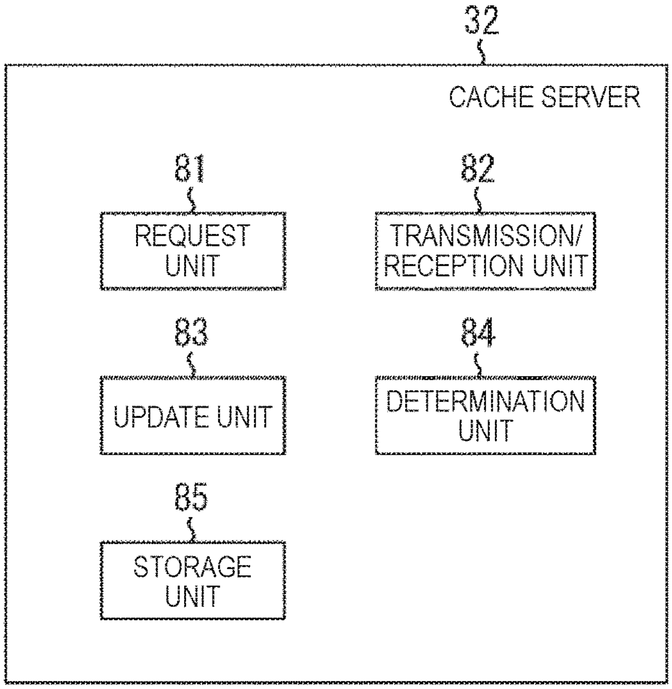
FIG. 4 is a block diagram illustrating a configuration of a DASH cache server.

FIG. 4 is a block diagram illustrating the configuration of the DASH cache server. The DASH cache server 32 includes a request unit 81, a transmission/reception unit 82, an update unit 83, a determination unit 84, and a storage unit 85.

The request unit 81 performs various types of request processing, such as requesting for a segment file. The transmission/reception unit 82 performs various types of transmission/reception processing such as transmitting a segment file, transmitting accumulated information, or receiving a request for a segment file. The update unit 83 performs various types of update processing such as updating segment file information. The determination unit 84 performs various types of determination processing such as whether there is a request for data transmission. The storage unit 85 stores content, segment file information, or the like.

Although not illustrated, the DASH origin server 31 also has the configuration similar to the DASH cache server 32 illustrated in FIG. 4.

Figure 5:
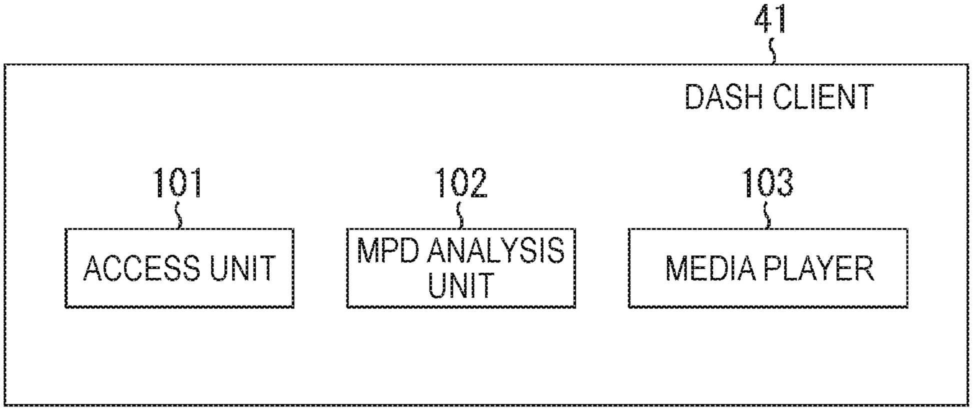
FIG. 5 is a block diagram illustrating a configuration of a DASH client.

FIG. 5 is a block diagram illustrating the configuration of the DASH client. The DASH client 41 includes an access unit 101, an MPD analysis unit 102, and a media player 103.

The access unit 101 performs various types of access processing such as determining whether a predetermined time is reached, acquiring an MPD file, requesting a segment file, or acquiring a segment file. The MPD analysis unit 102 performs various types of analysis processing such as determining a segment file at appropriate bitrate (encoding rate) or acquiring timed metadata. The media player 103 executes various types of playback-related processing, such as playing back content, determining whether content is being played back, or determining whether to play recommended content.

In the present technology, files segmented for each region are delivered from the CDN server 22 of the delivery system 11 to the terminal device 23 at regular time intervals, and images corresponding to them are displayed. The segmented files are now described, and then the operation of the delivery system 11 is described.

Figure 6:
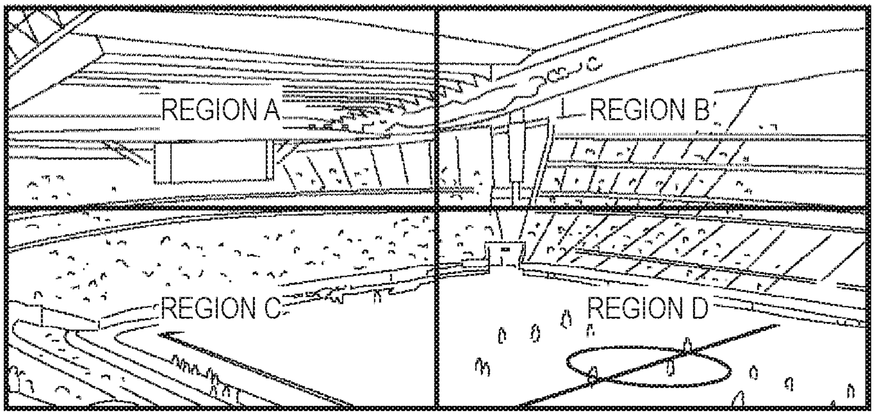
FIG. 6 is a diagram illustrated to describe screen split.

FIG. 6 is a diagram illustrated to describe screen split. FIG. 6 illustrates an image delivered according to the present technology. In this example, one screen is split into 2×2 regions. The upper left segmented region is a region A, the upper right segmented region is a region B, the lower left segmented region is a region C, and the lower right segmented region is a region D.

In the present technology, these regions A to D are described using, in one example, SRD as illustrated in FIG. 7. FIG. 7 is a diagram illustrating an example of description using SRD.

As illustrated in FIG. 7, the respective regions are described as follows.

| Description using SRD of region A |
| --- |
| <SupplementalProperty SchemeIdUri="urn: mpeg: dash: srd: 2014" value="0, 0, 1, 1, 2, 2"/> |
| Description using SRD of region B |
| <SupplementalProperty SchemeIdUri="urn: mpeg: dash: srd: 2014" value="0, 1, 0, 1, 1, 2, 2"/> |
| Description using SRD of region C |
| <SupplementalProperty SchemeIdUri="urn: mpeg: dash: srd: 2014" value="0, 0, 1, 1, 1, 2, 2"/> |
| Description using SRD of region D |
| <SupplementalProperty SchemeIdUri="urn: mpeg: dash: srd: 2014" value="0, 1, 1, 1, 1, 2, 2"/> |

The six numbers indicated in "value" represent grouping, x coordinate, y coordinate, width, height, overall width, and overall height of the regions as relative values. In other words, these regions A to D belong to group 0. The coordinate (x,y) of region A are (0,0), the coordinate (x,y) of region B is (1,0), the coordinate (x,y) of region C is (0,1), and the coordinate (x,y) of the region D is (1,1).

The width of the region A is one half of the width of the entire screen assuming that the width is 2. The height of the region A is also one half of the height of the entire screen assuming that the height is 2. This also applies to the regions C to D.

In this way, the image is segmented into 2×2 regions, and the image is segmented for each time and delivered. FIG. 8 illustrates this situation. FIG. 8 is a diagram illustrated to describe the arrangement of segmented files. In FIG. 8, the vertical axis represents the region of the screen and the horizontal axis represents time. In other words, the region is segmented into four regions A to D. The time is divided every 2 seconds.

In one example, in the region A, an image at time T=0 s, that is, for 2 seconds starting from 0 second is delivered as a file (segment file) named Segment_a_1.mp4. The image at time T=2 s, that is, for 2 seconds starting from 2 seconds is delivered as a segment file named Segment_a_2.mp4. The image at time T=4 s, that is, for 2 seconds starting from 4 seconds is delivered as a segment file named Segment_a_3.mp4. Similarly, the images of T=6 s, T=8 s, T=10 s, and T=12 s are delivered as segment files named Segment_a_4.mp4, Segment_a_5.mp4, Segment_a_6.mp4, and Segment_a_7.mp4, respectively.

In the region B, the image at time T=0 s, that is, for 2 seconds starting from 0 second is delivered as a segment file named Segment_b_1.mp4. The image at time T=2 s, that is, for 2 seconds starting from 2 seconds is delivered as a segment file named Segment_b_2.mp4. The image at time T=4 s, that is, for 2 seconds starting from 4 seconds is delivered as a segment file named Segment_b_3.mp4. Similarly, the images of T=6 s, T=8 s, T=10 s, and T=12 s are delivered as segment files named Segment_b_4.mp4, Segment_b_5.mp4, Segment_b_6.mp4, and Segment_b_7.mp4, respectively.

In one example, in the region A, media="$Bandwidth %/Segment_a_$Number$.mp4" is described, and in the region B, media="$Bandwidth %/Segment_b)$Number$.mp4" is described. In other words, the file name is described as Bandwidth indicating bitrate (encoding rate), Segment_a_$Number$.mp4, or Bandwidth and Segment_b_$Number$.mp4.

In this way, in the file names Segment_R_j.mp4, R (a, b, etc.) represents a region, and j (1, 2, 3, etc.) represents playback time. Thus, in the regions C and D, c or d is described at the position of R, and numbers 1, 2, 3, etc. indicating the corresponding time are described at the position of j.

In this way, the segment file name includes information of the region (R=a, b, c, and d) and time information (j=1, 2, 3, etc.). The information of the region is information of the interest region in a case where the region noticed by the user 44.

Moreover, in the same region (AdaptationSet), in a case where a segment (Representation) of a plurality of bitrates (bitrate) is delivered, the interest region is the same.

An example of the configuration of MPD fill in which the SRD is a relative description in the case where the screen is split into four as illustrated in FIG. 6 is described with reference to FIGS. 9 and 10. FIG. 9 and subsequent FIG. 10 are diagrams illustrating examples of MPD files.

The profile is not on-demand but live. The AdaptationSet of tiles A to D is described corresponding to the regions A to D. In tiles A to D, the SRD is relatively described in the AdaptationSet as follows.

```
<EssentialProperty schemeIdUri="urn:mpeg:dash:srd:2014"
value="0, 0, 0, 1, 1, 2, 2"/>
<EssentialProperty schemeIdUri="urn:mpeg:dash:srd:2014"
value="0, 1, 0, 1, 1, 2, 2"/>
<EssentialProperty schemeIdUri="urn:mpeg:dash:srd:2014"
value="0, 0, 1, 1, 1, 2, 2"/>
<EssentialProperty schemeIdUri="urn:mpeg:dash:srd:2014"
value="0, 1, 1, 1, 1, 2, 2"/>
```

According to the Segment Template generation rule, a segment file at duration=2, that is, every 2 seconds is acquired from the following uniform resource locator (URL).

| For region A |
|---|
| Http://cdn1.example.com/video/5000000/Segment_a1_.mp4<br>Http://cdn1.example.com/video/5000000/Segment_a_2.mp4<br>Http://cdn1.example.com/video/5000000/Segment_a_3.mp4<br>Http://cdn1.example.com/video/5000000/Segment_a_4.mp4 |
| For region B |
| Http://cdn1.example.com/video/5000000/Segment_b_1.mp4<br>Http://cdn1.example.com/video/5000000/Segment_b_2.mp4<br>Http://cdn1.example.com/video/5000000/Segment_b_3.mp4<br>Http://cdn1.example.com/video/5000000/Segment_b_4.mp4 |

The same applies to the regions C and D. In addition, 5000000 indicates that bitrate (encoding rate) is 5 Mbps.

In FIGS. 9 and 10, the SRD is a relative description, but can also be an absolute description. FIG. 11 and FIG. 12 illustrate examples of MPD files in this case. FIG. 11 and subsequent FIG. 12 are diagrams illustrating examples of MPD files.

In FIGS. 11 and 12, AdaptationSet of tile A to tile D is described corresponding to the regions A to D. In tile A to tile D, the SRD is absolutely described in the AdaptationSet as follows.

```
EssentialProperty schemeIdUri="urn:mpeg:dash:srd:2014"
value="0, 0, 0, 1920, 1080, 3840, 2160"/>
EssentialProperty schemeIdUri="urn:mpeg:dash:srd:2014"
value="0, 1920, 0, 1920, 1080, 3840, 2160"/>
EssentialProperty schemeIdUri="urn:mpeg:dash:srd:2014"
value="0, 0, 1080, 1920,1080, 3840, 2160"/>
EssentialProperty schemeIdUri="urn:mpeg:dash:srd:2014"
value="0, 1920, 1080, 1920, 1080, 3840, 2160"/>
```

The coordinate x and coordinate y represent the coordinates of the upper left pixel of each region. In one example, region A is (0,0), region B is (1920,0), region C is (0,1080), and region D is (1920,1080). The width of each region is 1920 pixels, the height is 1080 pixels, the overall width is 3840 pixels, and the overall height is 2160 pixels.

Figure 13:
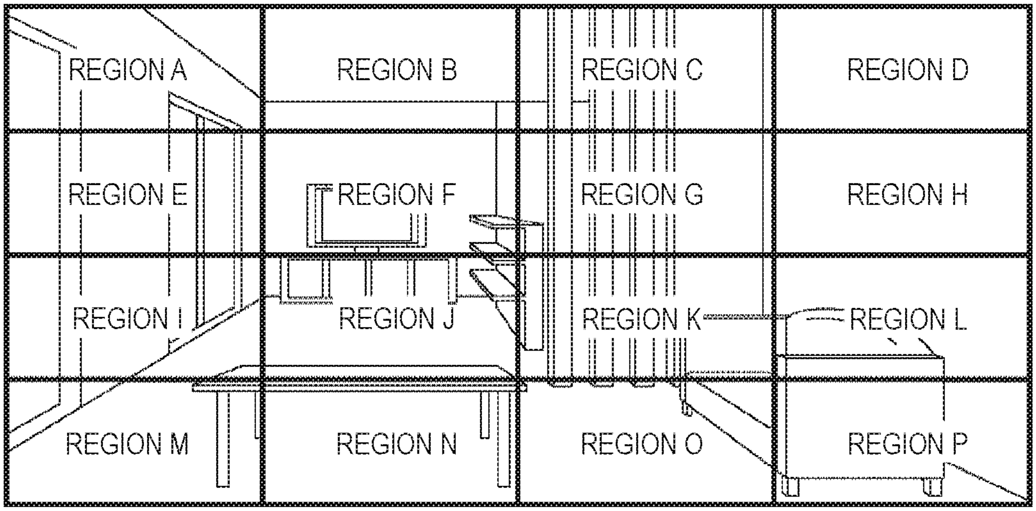
FIG. 13 is a diagram illustrated to describe screen split.

An MPD file in the case where the screen is split into 4×4 pieces is now described. FIG. 13 is a diagram illustrated to describe screen split. In this example, the screen is split into 16 regions from regions A to P. In the uppermost row, regions A, B, C, and D are sequentially arranged from the left, and in the second row, regions E, F, G, and H are sequentially arranged. Similarly, in the third row, regions I, J, K, and L are sequentially arranged from the left, and in the bottom row, regions M, N, O, and P are sequentially arranged.

An example of the MPD file in splitting the screen as illustrated in FIG. 13 is described with reference to FIGS. 14 to 16. FIG. 14 and subsequent FIG. 15, and further subsequent FIG. 16 are diagrams illustrating examples of MPD files. In FIGS. 14 to 16, AdaptationSet of tile A to tile P is described. However, some description is omitted for redundant description.

<EssentialProperty schemeIdUri="urn:mpeg:dash:coordinates:201X" value="equirectangular"/> in FIGS. 14 to 16 indicates that this AdaptationSet is an eccentric cylindrical projection. <EssentialProperty schemeIdUri="urn:mpeg:dash:srd:2014" value="0, 3, 3, 1, 1, 4, 4"/> indicates that this SRD information is a part of the 2-dimensional image coordinates of the eccentric cylinder.

In this example as well, the SRD is represented with relative coordinates. In one example, in the region A, the coordinates (x,y) are (0,0), the width is 1 that is ¼ of the overall width 4, and the height is 1 that is ¼ of the overall height 4.

In the region D, the coordinates (x,y) are (3,0), the width is 1 that is ¼ of the overall width 4, and the height is 1 that is ¼ of the overall height 4.

In the region P, the coordinates (x,y) are (3,3), the width is 1 that is ¼ of the overall width 4, and the height is 1 that is ¼ of the overall height 4.

Further, although not illustrated, the SRD information of the two-dimensional image coordinates in FIGS. 14 to 16 can be represented with three-dimensional coordinates of a spherical VR image before mapping.

<Content Delivery Processing in Delivery System (FIGS. 17 to 21)>

Figure 17:
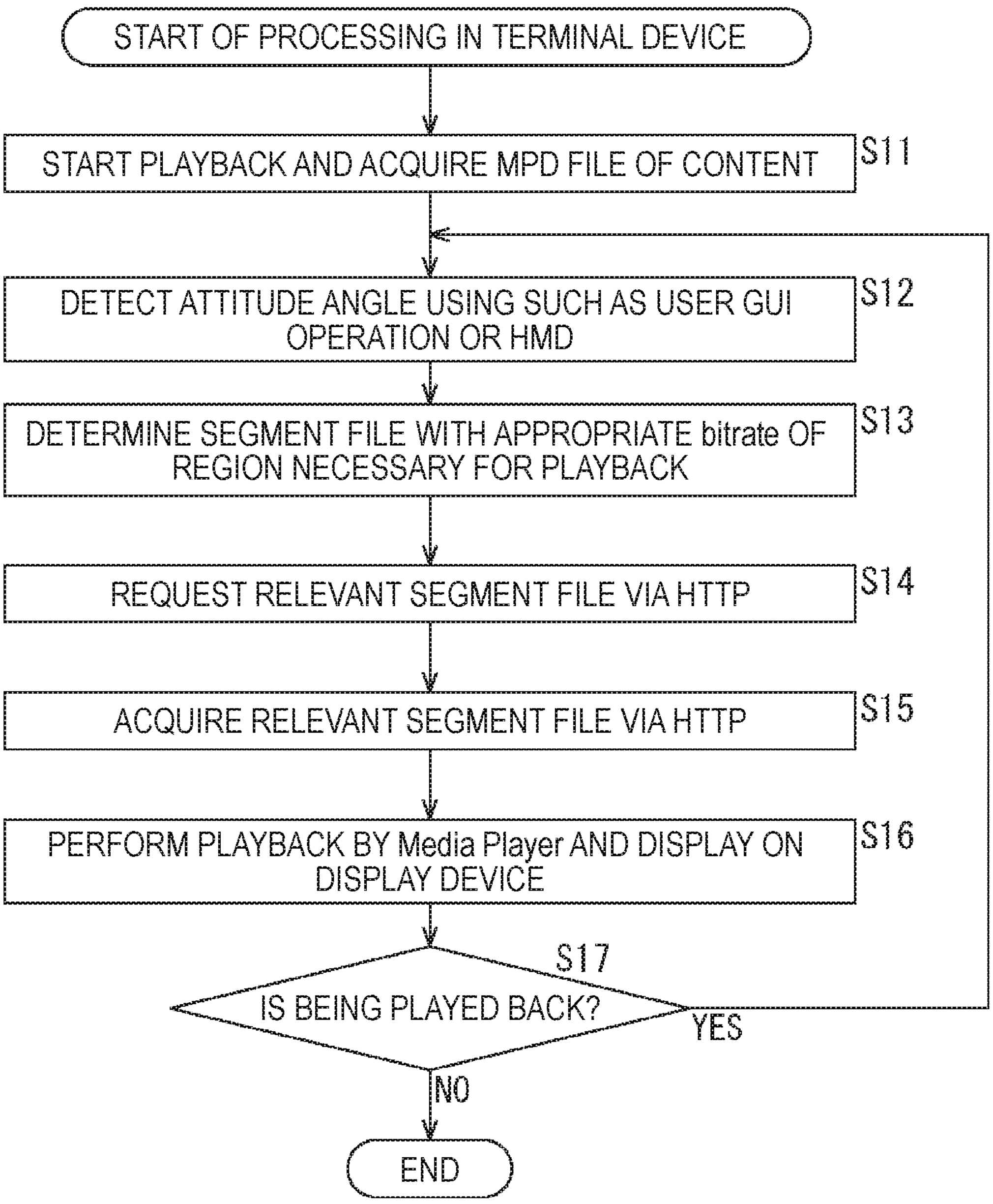
FIG. 17 is a flowchart illustrating processing in a terminal device.
Figure 18:
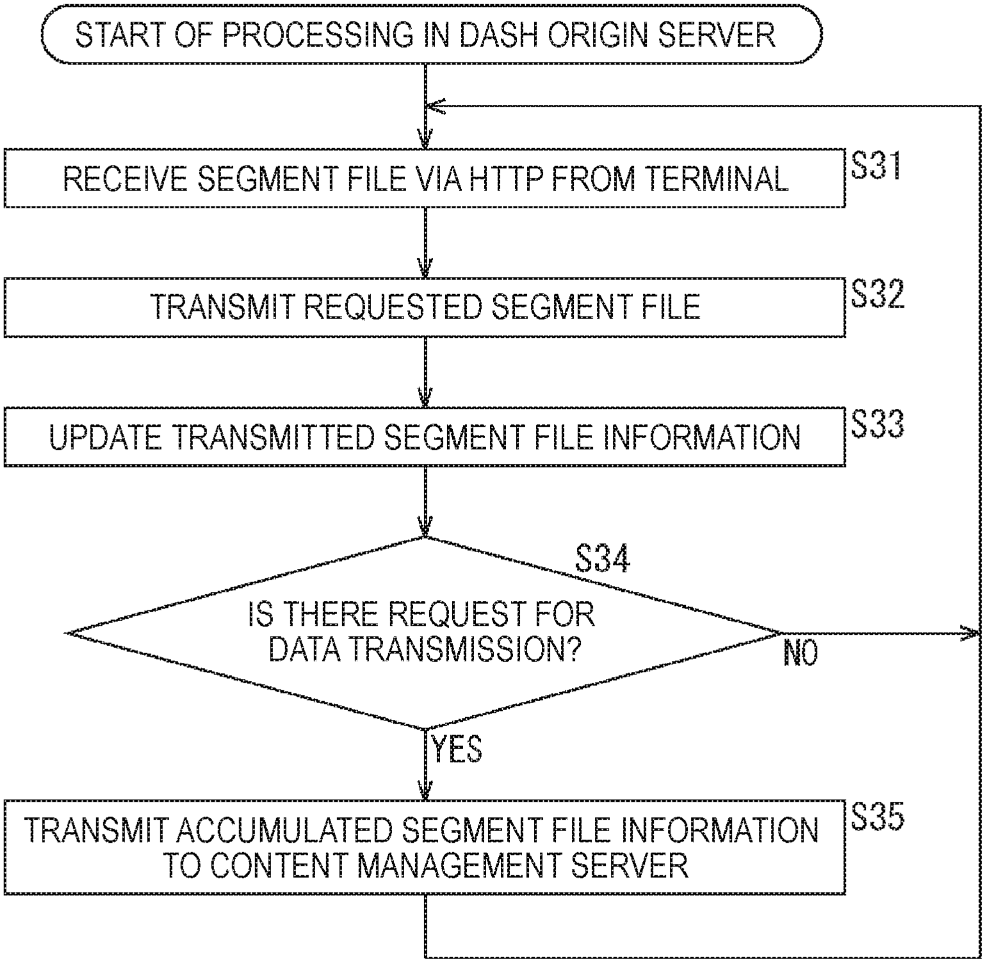
FIG. 18 is a flowchart illustrating processing in a DASH cache server.
Figure 19:
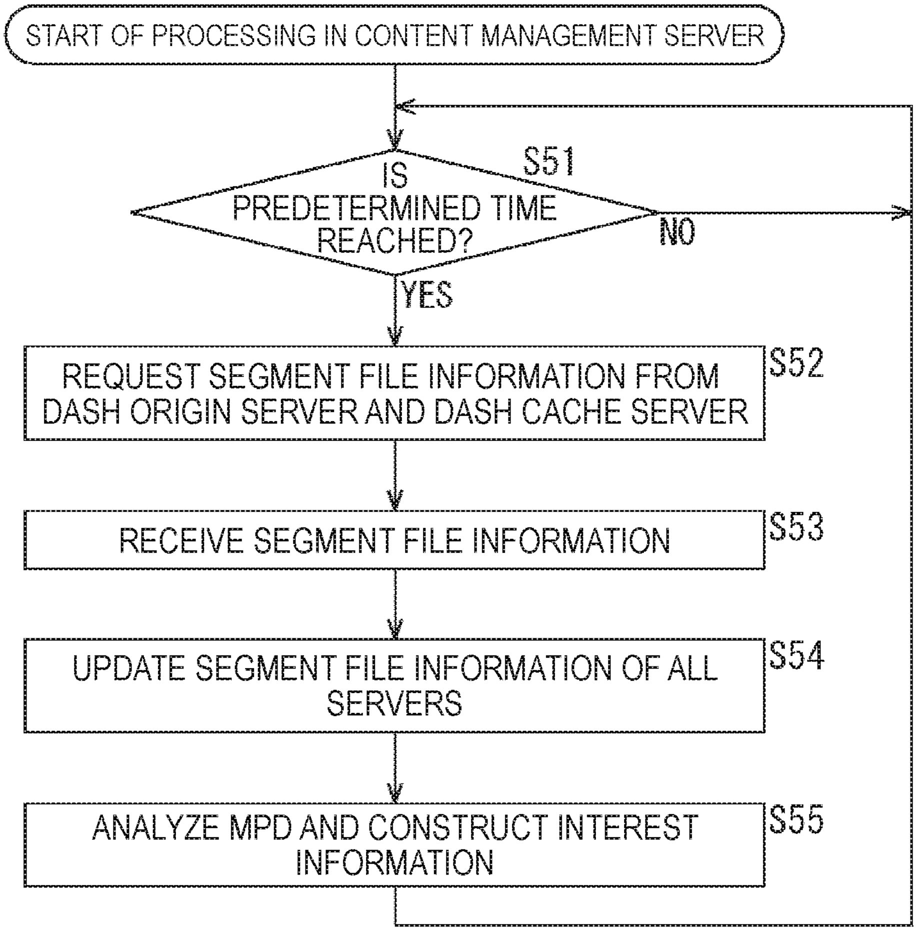
FIG. 19 is a flowchart illustrated to describe processing in a content management server.

Then, with reference to FIGS. 17 to 19, the content delivery processing in the delivery system 11 is described as the processing in the terminal device 23, the DASH cache server 32, and the content management server 21.

The processing by the terminal device 23 is first described with reference to FIG. 17. FIG. 17 is a flowchart illustrated to describe the processing in the terminal device.

In step S11, the media player 103 starts playing back of content. In one example, when the user 44 selects an icon of content of a web page described in hypertext markup language (HTML), the GUI/attitude-angle detection device 43 detects the operation. The access unit 101 accesses the URL corresponding to the icon operation and acquires an MPD file of the content, which is stored in the storage unit 85 of the DASH cache server 32 and transmitted from the transmission/reception unit 82. The media player 103 plays back the content and causes the display device 42 to display it.

Alternatively, in the case of paid content, the URL is provided after charging processing is completed, so the access unit 101 requests the content from the DASH cache server 32 on the basis of the URL. The transmission/reception unit 82 of the DASH cache server 32 receives the URL. The MPD file of the content stored in the URL of the storage unit 85 is read out and is transmitted through the transmission/reception unit 82. The access unit 101 acquires it, and the media player 103 plays back the content and causes the display device 42 to display the content.

In step S12, the GUI/attitude-angle detection device 43 detects an operation of a user's remote controller, GUI operation, attitude angle by HMD, or the like. In other words, in the case where the user 44 specifies a predetermined region of an image displayed on the display device 42 as the interest region, the specified region is detected.

In step S13, the MPD analysis unit 102 determines a segment file with appropriate bitrate of a region necessary for playback. This determination is made on the basis of the information described in the MPD file acquired in step S11 depending on information of a region being noticed and the current bandwidth of the network 51. The bitrate of each segment can be obtained from Bandwidth.

In step S14, the access unit 101 requests the segment file via HTTP. In other words, the segment file of the predetermined interest region determined in step S13 is requested from the DASH cache server 32. The transmission/reception unit 82 of the DASH cache server 32 receives this request in step S31 of FIG. 18 described later. The segment file stored in the storage unit 85 is read out and is transmitted through the transmission/reception unit 82 to the terminal device 23 in the processing of step S32 in FIG. 18.

In step S15, the access unit 101 of the DASH client 41 acquires the segment file transmitted from the DASH cache server 32. In other words, the segment file requested in step S14 is acquired via HTTP.

In step S16, the media player 103 plays back the segment file acquired in step S15 and causes the display device 42 to display it.

In step S17, the media player 103 determines whether the content is being played back. If it is still being played back, the processing returns to step S12, and the subsequent processing is repeated. If it is determined in step S17 that the content is not being played back, the processing is terminated.

As described above, the terminal device 23 displays an image of the region noticed by the user 44.

As described above, in the case where the content in the region noticed by the user 44 in the terminal device 23 is played back, the DASH cache server 32 performs processing of accumulating the segment files delivered to the terminal device 23. The processing in this case is described with reference to FIG. 18.

FIG. 18 is a flowchart illustrated to describe the processing in the DASH cache server. In step S31, the transmission/reception unit 82 of the DASH cache server 32 receives a request for a segment file via HTTP from the terminal device 23. In other words, as described above, in step S14 of FIG. 17, the access unit 101 of the DASH client 41 requests a segment file via HTTP. This request is received in this step.

In step S32, the storage unit 85 reads out the requested segment file. The transmission/reception unit 82 transmits the read segment file to the terminal device 23. The transmitted segment file is received by the terminal device 23 in step S15 of FIG. 17 and is displayed in step S16. In other words, the content (segment file) of the interest region specified by the user 44 is supplied to the terminal device 23 and is displayed.

In step S33, the update unit 83 updates the segment file information in transmission. In other words, the segment file information of the segment file transmitted previously to the terminal device 23 is stored in the storage unit 85. The stored contents are updated to the latest information.

The segment file information is now described. As described above, the segment file has information relating to the interest region and time information. The segment file information includes the URL (in time series) of the segment file and the number of times that segment file is sent to the terminal device 23 using, in one example, extensible markup language (XML) data. The URL is described in the example of the MPD file in FIGS. 9 and 10. Depending on the configuration of the CDN server 22, the server receiving the HTTP request may be redirected to another server that actually sends the segment file, so the number of times of transmission is recorded. In other words, in counting the number of times of request, in the case of redirect, the number of times is doubly counted and is inaccurate, so the number of times of transmission of the segment file is counted instead of the number of times of request. Depending on the configuration of the CDN server 22, it is also possible to count the number of times of request.

In step S34, the determination unit 84 determines whether there is a request for data transmission. In other words, as will be described later with reference to FIG. 19, the content management server 21 requests transmission of a segment file in step S52 when a certain time is reached. The determination as to whether this request is received is performed.

In a case where the request is not received from the content management server 21 yet, the processing returns to step S31, and the subsequent processing is repeated. In a case of receiving a request to transmit the segment file information from the content management server 21, the transmission/reception unit 82 transmits the accumulated segment file information to the content management server 21 in step S35. In other words, the segment file information stored in the storage unit 85 is read out and is transmitted from the transmission/reception unit 82. Then, the processing returns to step S31 and the subsequent processing is repeated.

Moreover, in this example, the segment file information is transmitted in response to a request from the content management server 21. However, it is also possible to transmit the segment file information from the DASH cache server 32 to the content management server 21 at predetermined time intervals.

The segment file information has the URL and the number of segment file having the user's interest region and time information, so it is the region of interest (ROI) information of the user 44.

Moreover, although not described, the DASH origin server 31 also executes the processing of FIG. 18 and transmits the segment file information to the content management server 21.

In this way, the DASH cache server 32 that received the request only collects and accumulates the segment file information relating to the segment requested from the terminal device 23. Thus, no special processing or communication is necessary for the DASH cache server 32 to collect interest region information from the terminal device 23.

As described above, the DASH cache server 32 and the DASH origin server 31, that is, the CDN server 22 executes the processing of transmitting the segment file information to the content management server 21. In response to this, the content management server 21 accumulates the segment file information and executes the process of constructing the interest information. The processing in the content management server 21 is now described with reference to FIG. 19.

FIG. 19 is a flowchart illustrated to describe the processing in the content management server. In step S51, the determination unit 61 of the content management server 21 determines whether a predetermined time is reached. In other words, it is determined whether a preset time is reached. In a case where a certain time is not reached, the determination processing of step S51 is repeated. In other words, the content management server 21 waits by until the time is reached.

In the case where the predetermined time is reached, in step S52, the request unit 62 requests the segment file information from the DASH origin server 31 and the DASH cache server 32. In other words, the DASH origin server 31 and the DASH cache server 32 update the processing of step S33 in FIG. 18 up to that time, and the accumulated segment file information is requested to be transmitted.

Moreover, as described above, in the case of the predetermined time is reached, if the DASH origin server 31 and the DASH cache server 32 transmit the segment file information, the processing of steps S51 and S52 is omitted.

As described above, upon receiving the request for the segment file information, the DASH origin server 31 and the DASH cache server 32 transmit the segment file information accumulated up to that time in step S35 of FIG. 18. In step S53 of FIG. 19, the acquisition unit 63 of the content management server 21 receives and acquires the segment file information. The storage unit 67 stores this segment file information.

In step S54, the update unit 64 updates the segment file information of all the servers. In other words, the all the pieces of segment file information sent from the DASH origin server 31 and the DASH cache server 32 are updated. In this case, it is also possible to update the segment file information for each one or a plurality of servers, in one example, for each area. Alternatively, the segment file information may be updated for each profile of the user 44.

In step S55, the construction unit 65 analyzes the MPD file and constructs interest information. The interest information includes, in one example, time series, time information, and the number of times of transmission of the interest region of the content. The information regarding what region is played back and how many times it is played back can be obtained from the segment file information updated in step S54. The time series and the time information of the interest region can be obtained from a file name obtained by searching the file name of the segment file the MPD file on the basis of the URL (including the time series) included in the segment file information. The MPD file of the segment file is stored in advance in the storage unit 67 of the content management server 21 that manages all types of content. Moreover, in a case where a plurality of bitrate segment files is delivered in the same region, the number of times is counted as the same interest region.

In this way, pieces of segment file information of a plurality of terminal device 23 are collected and accumulated in the content management server 21, so a database of interest information as preference information can be constructed.

Then, an example of the interest information constructed in the content management server 21 as described above is described with reference to FIGS. 20 and 21. FIG. 20 and FIG. 21 are diagrams illustrated to describe an example of the interest information of content.

In the example of FIG. 20, segment files in the case where the screen is split into 2×2 pieces are delivered in time series. This delivery is the same as the case illustrated in FIG. 6. In other words, in the region A, the segment files Segment_a_1.mp4 to Segment_a_7.mp4 are delivered at timings of time T=0 s to time T=12 s. In the region B, the segment files Segment_b_1.mp4 to Segment_b_7.mp4 are delivered at timings of time T=0 s to time T=12 s. In the region C, the segment files Segment_c_1.mp4 to Segment_c_7.mp4 are delivered at timings from time T=0 s to time T=12 s. In the region D, the segment files Segment_d_1.mp4 to Segment_d_7.mp4 are delivered at timing of time T=0 s to time T=12 s. In other words, the description of SRD in each region is the same as the case illustrated in FIG. 7.

Then, the number of times of playback of the segment file (region) at timings of time T=0 s to time T=12 s in the region A is 10, 10, 100, 100, 10, 10, and 10, respectively. The number of times of playback of segment files at timings of time T=0 s to time T=12 s in the region B is 100, 10, 10, 10, 100, 100, and 10, respectively. In addition, the number of times of playback of the segment file at timings of time T=0 s to time T=12 s in the region C is 10, 100, 10, 10, 10, 10, and 10, respectively. The number of times of playback of the segment file at timings of time T=0 s to time T=12 s in the region D is 10, 10, 10, 10, 10, 10, and 100, respectively.

In this way, in a case where one segment file of bitrate is delivered for each region, it can combine the region information and the time information by the segment file name.

In the example of FIG. 21, the interest information of the content includes the time information and the number of times of sending of the segment file (region) for each region. The specific number of times of transmission is similar to the case in FIG. 20.

Second Embodiment

<Recommendation Delivery Processing in Delivery System (FIGS. 22 to 35)>

The content management server 21 that constructs the interest information as described above generates recommendation information on the basis of the interest information, and delivers it to the terminal device 23. Thus, as a processing example in this case, first to third processing examples are described below.

Figure 22:
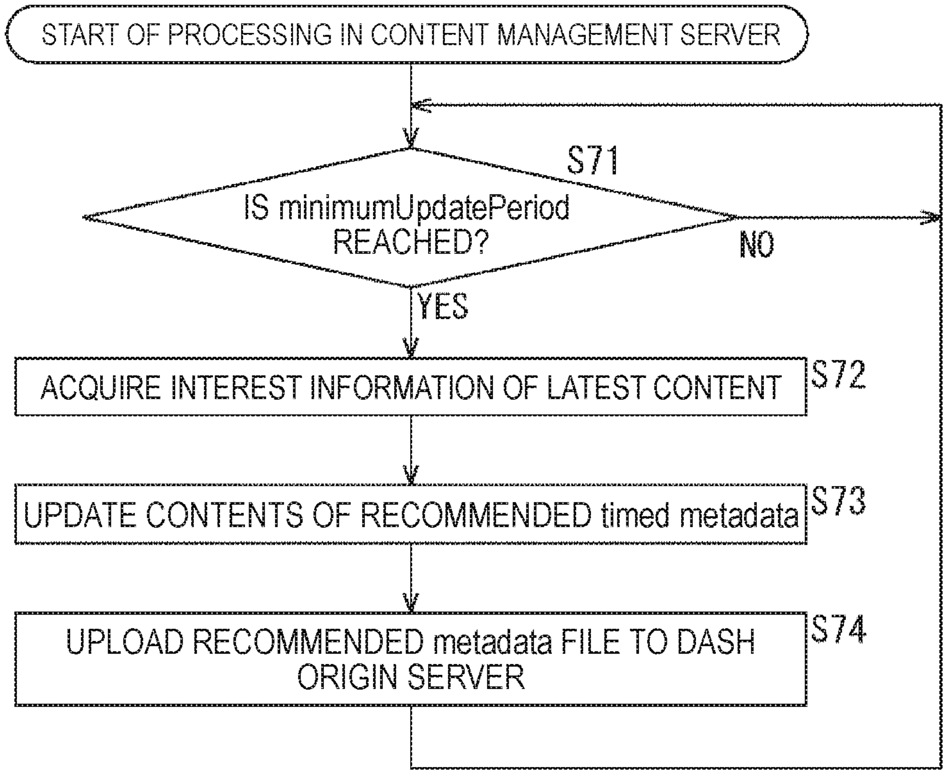
FIG. 22 is a flowchart illustrated to describe processing in a content management server.
Figure 23:
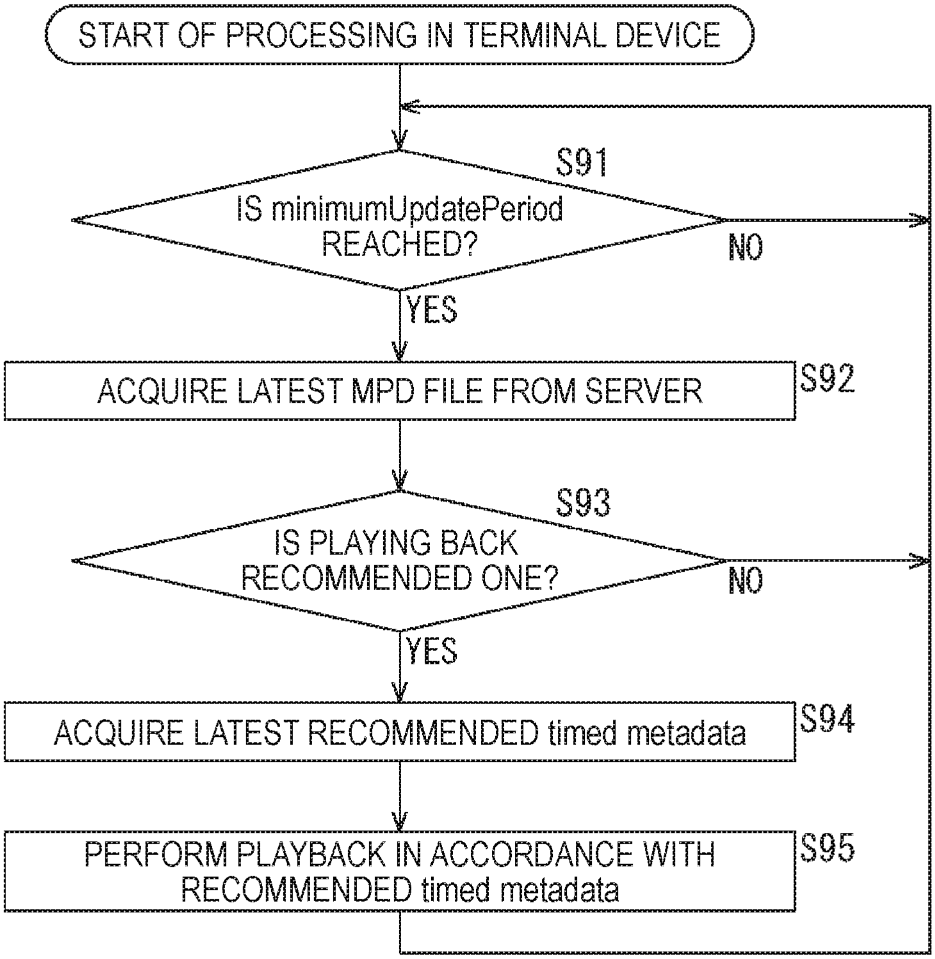
FIG. 23 is a flowchart illustrating processing in a terminal device.

The first processing example is first described with reference to FIGS. 22 and 23. In the first processing example, the Timed metadata track is delivered by AdaptationSet including the recommended Timed metadata track together with the MPD, and the recommended playback is implemented by acquiring the segment of the interest region on the basis of the timed metadata track information in the terminal device 23.

The processing in the content management server 21 is first described with reference to FIG. 22. FIG. 22 is a flowchart illustrated to describe the processing in the content management server. In step S71, the determination unit 61 determines whether minimumUpdatePeriod is reached. In other words, the update cycle for updating the recommendation information is determined in advance, and it is determined whether the update cycle has elapsed. If the update cycle has not yet elapsed, the processing of step S71 is repeated until the update cycle has elapsed.

In a case where the update cycle (e.g., 10 seconds) has elapsed, in step S72, the acquisition unit 63 acquires interest information of the latest content. In other words, the construction unit 65 stores the interest information of the content and its contents are periodically updated in the processing illustrated in FIG. 19. Then, the latest one is read out and is acquired.

In step S73, the update unit 64 updates the contents of the recommended timed metadata. In other words, the recommended timed metadata, which is the recommendation information generated by the generation unit 68, is stored in the storage unit 67, and its contents are updated so that they correspond to the interest information updated in step S72. The recommendation information will be described later with reference to FIG. 24 and FIG. 25, and the recommended timed metadata will be described later with reference to FIGS. 26 and 27.

In step S74, the output unit 66 uploads the timed metadata file to the DASH origin server 31. The uploaded recommended timed metadata is supplied to the terminal device 23 via the DASH cache server 32. This point will be described later with reference to FIG. 23. The subsequent processing returns to step S71, and the subsequent processing is repeated.

In this way, the recommendation information (recommended timed metadata file) is periodically uploaded to the DASH origin server 31.

Moreover, in this example, the information used to access the timed metadata track is only described in the MPD file, so it is not necessary to rewrite the actual MPD file and it is only necessary to update the rewritten timed metadata track.

On the other hand, the terminal device 23 uses the recommendation information as follows. The processing in this case is described with reference to FIG. 23.

In step S91, the access unit 101 of the DASH client 41 of the terminal device 23 determines whether the minimumUpdatePeriod is reached. In other words, as described in step S74 of FIG. 22, the content management server 21 transmits taimed metadataq when the update cycle of the recommendation information has elapsed. Thus, if the update cycle has not yet elapsed, the processing of step S91 is repeated until the update cycle has elapsed.

In the case where the update cycle has elapsed, the access unit 101 acquires the latest MPD file from the server in step S92. In one example, the MPD file illustrated in FIGS. 28 and 29 to be described later is acquired. In other words, the recommended timed mediadata, which is uploaded by the content management server 21 to the DASH origin server 31 in step S74 of FIG. 22, is supplied to the DASH cache server 32. Thus, the recommended MPD file that can access the recommended timed mediadata is acquired from the DASH cache server 32. As described above, in the terminal device 23, the latest MPD file as illustrated in FIGS. 28 and 29 to be described later is acquired, in one example, every 10 seconds.

In step S93, the media player 103 determines whether to play back the recommended one. This determination is made on the basis of an instruction from the user 44. In a case where there is no instruction to perform playback from the user 44, the processing returns to step S91 and the subsequent processing is repeated.

In a case where it is determined in step S93 to play the recommended one, the MPD analysis unit 102 acquires the latest timed metadata file in step S94. The latest timed metadata file is acquired on the basis of the latest MPD file acquired in step S92. As described above, the timed metadata file uploaded and held by the DASH origin server 31 (accordingly to the DASH cache server 32) by the processing of step S74 in the content management server 21 in FIG. 22 is periodically updated to the latest one.

In step S95, the media player 103 performs playback in accordance with the recommended timed metadata after the current time. The recommended timed metadata, which is new recommendation information, is acquired in step S94. Then, the processing returns to step S91 and the subsequent processing is repeated.

As described above, the recommendation information generated on the basis of the interest information collected and constructed by the content management server 21 is delivered to the terminal device 23, and the content is played back in accordance with the recommendation information.

The recommendation information generated on the basis of the interest information of the content by the content management server 21 is configured as follows, in one example. FIG. 24 is a diagram illustrated to describe an example of recommended content information.

The example of FIG. 24 shows the recommendation information generated on the basis of the interest information of FIG. 20. In other words, similarly to the case illustrated in FIG. 20, the segment files of the four regions A to D are delivered as many number of times as described in each segment in time series. In this recommendation information, the one in which the regions with the largest number of times of playback are arranged in time series is used as recommendation information of the region noticed by a plurality of users 44. In other words, the time series of the next segment (region) having the number of times of playback of 100 times are used as the recommendation information.

T=0 s Segment_b_1.mp4
T=2 s Segment_c_2.mp4
T=4 s Segment_a_3.mp4
T=6 s Segment_a_4.mp4
T=8 s Segment_b_5.mp4
T=10 s Segment_b_6.mp4
T=12 s Segment_d_7.mp4

FIG. 25 is a diagram illustrated to describe an example of recommended content information. The example in FIG. 25 represents the recommendation information generated on the basis of the interest information in FIG. 21. In other words, similarly to the case illustrated in FIG. 21, the number of times of playback of the segment files of the four regions A to D is arranged in time series. Even in this recommendation information, one in which the regions with the largest number of times of playback are arranged in time series is used as the recommendation information of the regions noticed by the plurality of users 44. In other words, the time series of the next segment (region) having the number of times of playback of 100 times are used as the recommendation information.

Figure 26:
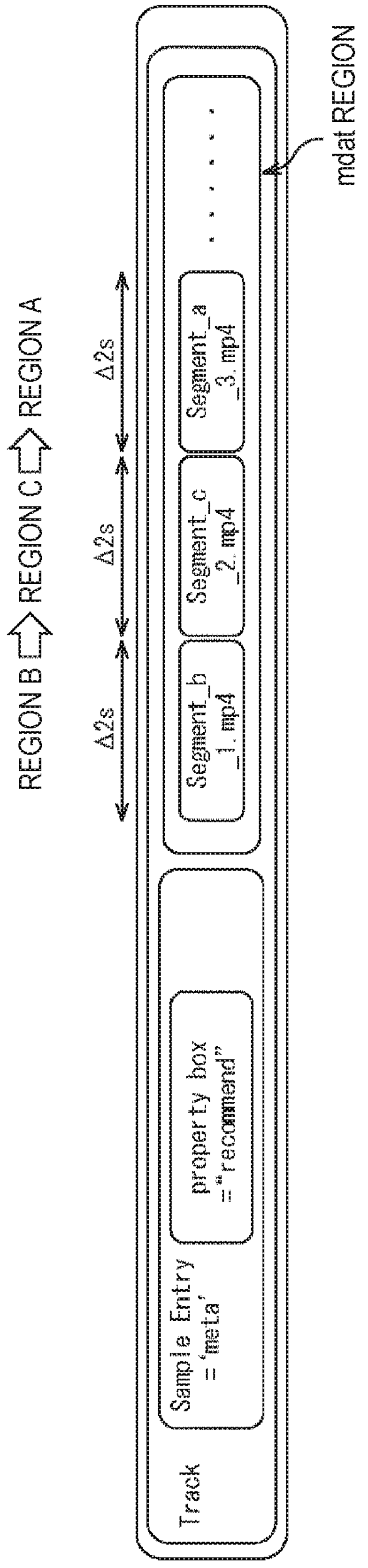
FIG. 26 is a diagram illustrating an example of timed metadata.
Figure 27:
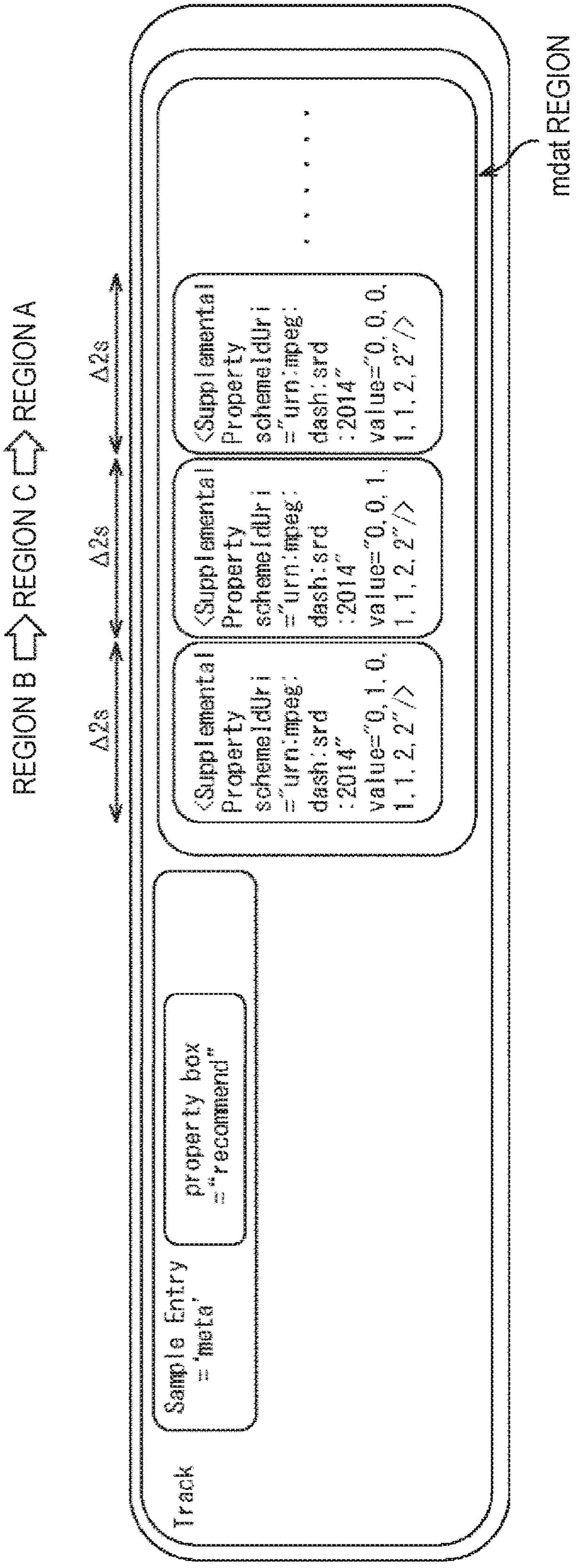
FIG. 27 is a diagram illustrating an example of timed metadata.

T=0 s region B
T=2 s region C
T=4 s region A
T=6 s region A
T=8 s region B
T=10 s region B
T=12 s region D An example of timed metadata, which is updated in step S73 of FIG. 22 and uploaded in step S74, is now described with reference to FIGS. 26 and 27. FIG. 26 and FIG. 27 are diagrams illustrating examples of timed metadata.

In the example of the MP4 file of FIG. 26, a sample entry (Sample Entry) of a track (Track) is set to 'meta'. This indicates that this track is a metadata track. In addition, the property box in Sample Entry is set to "recommend". This indicates that this track is a track of recommendation information. In the mdat region corresponding to this track, recommended metadata is arranged. In other words, the name of the segment file is stored as sample data (Sample data) in time series. In this example, the name of the segment file at the interval of 2 seconds (Δ2 s) is described with Segment_b_1.mp4 in the region B, Segment_c_2.mp4 in the region C, Segment_a_3.mp4 in the region A, etc. in a time series manner. In other words, the segment file name for each region is described for each time. This time series is the same as in the case of FIG. 24.

In the example of the MP4 file of FIG. 27, Sample Entry of Track is also set to 'meta', and the property box of Sample Entry is set to "recommend". The recommended metadata is arranged in the mdat region corresponding to this track. In other words, the DASH SRD parameter is stored as the region information in time series as Sample data.

In other words, in the example of FIG. 27, SRD information as region information is stored as timed metadata. Thus, in the case where two or more representations having different bitrates (encoding rate) are delivered to one region, only the region information is transmitted, so it is possible to select an optional representation of bitrate in the same region on the side of the terminal device 23.

Moreover, the recommendation information can also be arranged in another layer of ISO base media file format (ISOBMFF).

An example of the MPD file, which describes regions segmented into four pieces using SRD and describes the recommended track, is illustrated in FIGS. 28 and 29. FIG. 28 and subsequent FIG. 29 are diagrams illustrating examples of MPD files.

In the last recommended AdaptationSet of FIG. 29, <Role schemeIdUri="urn:mpeg:dash:role:201X" value="recommend"/> is described. This Role descriptor indicates that this AdaptationSet relates to recommendation information. Here, file segment_recommend.mp4 describing the recommendation information is described.

<Representation id="5" bandwidth="10000" dependencyId="1, 2, 3, 4"> indicates that has four regions of Representation id=1, 2, 3, and 4 (regions indicated by AdaptationSet of tile A, tile B, tile C, and tile D) is recommended.

MinimumUpdatePeriod="PT10S" specifies the time period for updating the MPD file. In other words, in this example, the MPD file is updated every ten seconds (step S71 in FIG. 22 or step S91 in FIG. 23). Accordingly, the terminal device 23 acquires a new MPD file after the lapse of the time (step S92 in FIG. 23). The content management server 21 updates it to the segment_recommend.mp4 in which the latest recommendation information is described (step S74 in FIG. 22).

<EssentialProperty schemeIdUri="urn:mpeg:dash: MPDupdate:201X" value="segment, true"/> indicates that contents of segment of this AdaptationSet are updated by MPDupdate.

Figure 30:
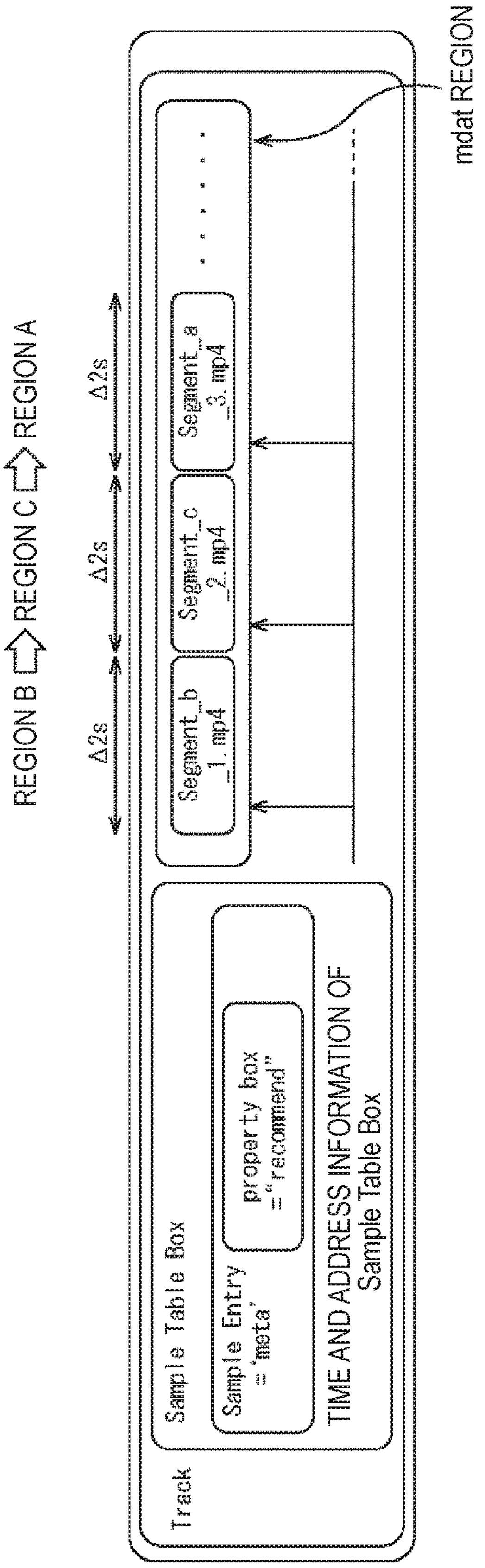
FIG. 30 is a diagram illustrating an example of timed metadata
Figure 31:
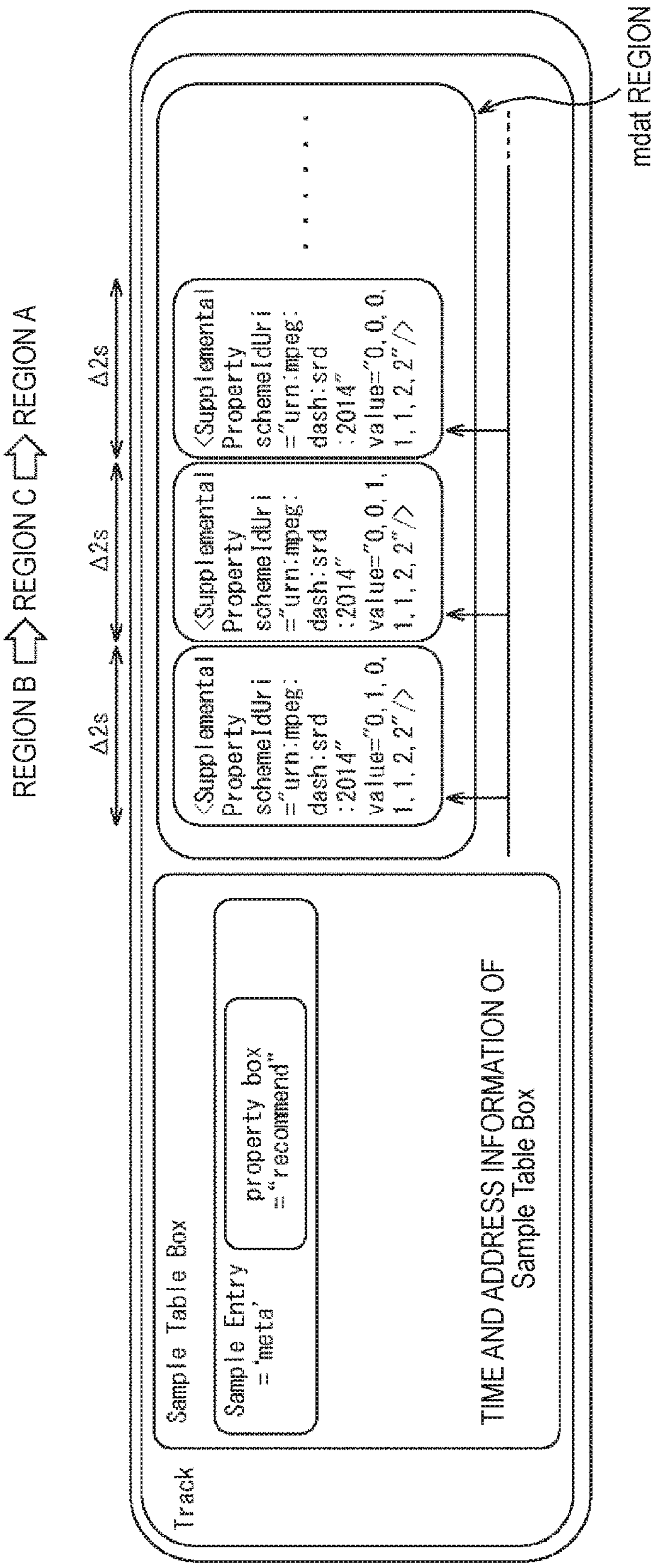
FIG. 31 is a diagram illustrating an example of timed metadata

The concept of accessing Sample of track is now described with reference to FIG. 30 and FIG. 31. FIG. 30 and FIG. 31 are diagrams illustrating examples of timed metadata. In the MP4 file illustrated in FIG. 26 and FIG. 27, as a mechanism of the MP4 file, it is possible to access Sample at an optional time by using the Sample Table box of track.

In other words, as illustrated in FIG. 30 corresponding to FIG. 26, in the MP4 file, it is possible to access the Sample in the mdat region on the basis of information regarding time and address in Sample Table Box including Sample Entry. In other words, it is possible to access segment_b_1.mp4, segment_c_2.mp4, segment_a_3.mp4, etc., which are the recommendation information.

In the case illustrated in FIG. 31 corresponding to FIG. 27, it is possible to access the Sample included in the mdat region, i.e., the SRD information that is the information of the region, on the basis of information regarding time and address in Table Box.

A second processing example in the case where the content management server 21 generates the recommendation information on the basis of the constructed interest information and delivers it to the terminal device 23 is now described with reference to FIGS. 32 and 33. In the first processing example described with reference to FIGS. 22 and 23, although the recommendation information is delivered by timed metadata track, in this second processing example, the playback order of the recommended segment is enumerated in the MPD file.

In the second processing example, a recommended AdaptationSet including a time-series segment list is delivered to the MPD file, and the playback of the recommended one in the interest region is implemented by acquiring the recommended AdaptationSet in the order of the segment list on the side of the terminal device 23.

The processing in the content management server 21 is first described with reference to FIG. 32. In step S111, the determination unit 61 determines whether minimumUpdatePeriod is reached. In other words, it is determined whether the update cycle for updating the recommendation information has elapsed. If the update cycle has not yet elapsed, the processing of step S111 is repeated until the update cycle has elapsed.

In a case where the update cycle has elapsed, in step S112, the acquisition unit 63 acquires interest information of the latest content. In other words, the construction unit 65 stores the interest information of the content, the latest one of them is read out and is acquired.

In step S113, the update unit 64 updates the contents of the recommended segment list. In other words, the recommended segment list, which is the recommendation information generated by the generation unit 68, is stored in the storage unit 67, and its contents are updated to correspond to the latest interest information acquired in step S112. The recommendation information is as described with reference to FIG. 24 and FIG. 25. The recommended segment list will be described later with reference to FIG. 35.

In step S114, the output unit 66 uploads the updated MPD file. This uploading is also performed to the DASH origin server 31. The uploaded MPD file is supplied to the terminal device 23 via the DASH cache server 32. This point will be described later with reference to FIG. 33. Then, the processing returns to step S111, and the subsequent processing is repeated.

As described above, the segment list is periodically uploaded.

Moreover, instead of updating the MPD file, the recommended AdaptionSet fixed at a certain time may be stored. In this case, type="static" is set in the MPD file.

On the other hand, the terminal device 23 uses the segment list in which the recommendation information is described as follows. The processing in this case is described with reference to FIG. 33.

In step S131, the access unit 101 determines whether minimumUpdatePeriod is reached. In other words, as described in step S111 of FIG. 32, the content management server 21 transmits an MPD file when an update cycle for updating the recommendation information has elapsed. In a case where the update cycle has not passed yet, the processing of step S131 is repeated until the update cycle has elapsed.

In a case where the update cycle has elapsed, the access unit 101 acquires the latest MPD file from the server in step S132. In other words, the recommended MPD file, which is uploaded by the content management server 21 to the DASH origin server 31 in step S114 of FIG. 32, is supplied to the DASH cache server 32. Thus, the MPD file in which the recommendation information is described is acquired from the DASH cache server 32.

In step S133, the media player 103 determines whether to play back the recommended one. In a case where there is no instruction to perform playback from the user 44, the processing returns to step S131, and the subsequent processing is repeated.

In a case where it is determined in step S133 that the recommended one is to be played back, the media player 103 performs playback in accordance with the segment list that is the new recommendation information in step S134. This playback is performed after the current playback time. The recommended segment list, which is the new recommendation information, is described in the MPD file acquired in step S132. Then, the processing returns to step S131, and the subsequent processing is repeated.

As described above, the recommendation information generated on the basis of the interest information collected and constructed by the content management server 21 is delivered to the terminal device 23, and the content is played back in accordance with the recommendation information.

Figure 32:
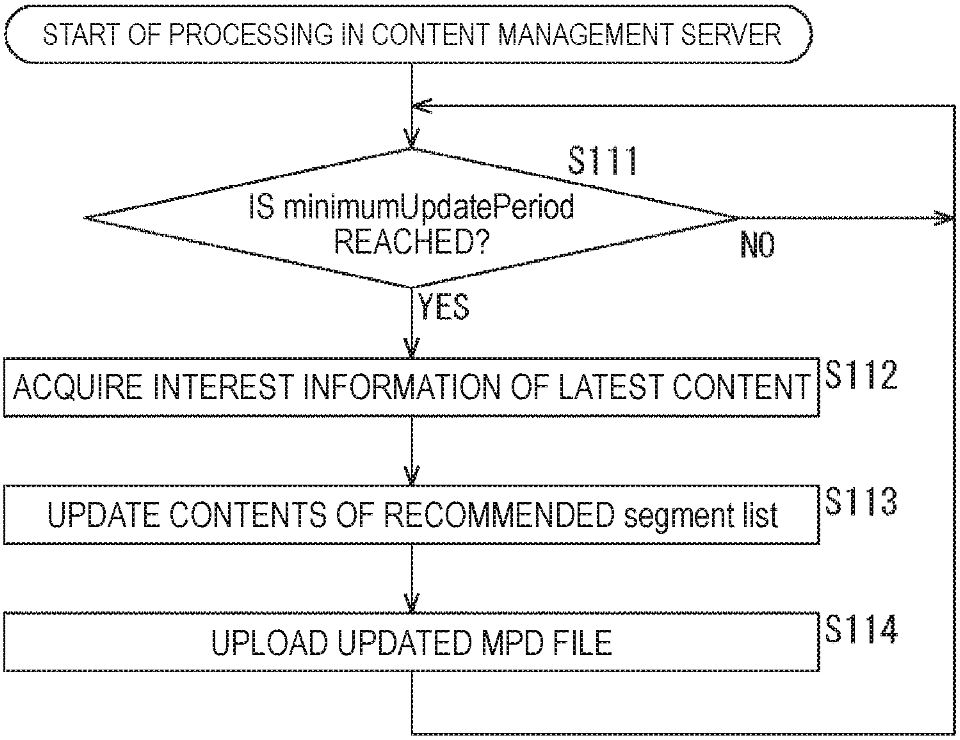
FIG. 32 is a flowchart illustrated to describe processing in a content management server.
Figure 33:
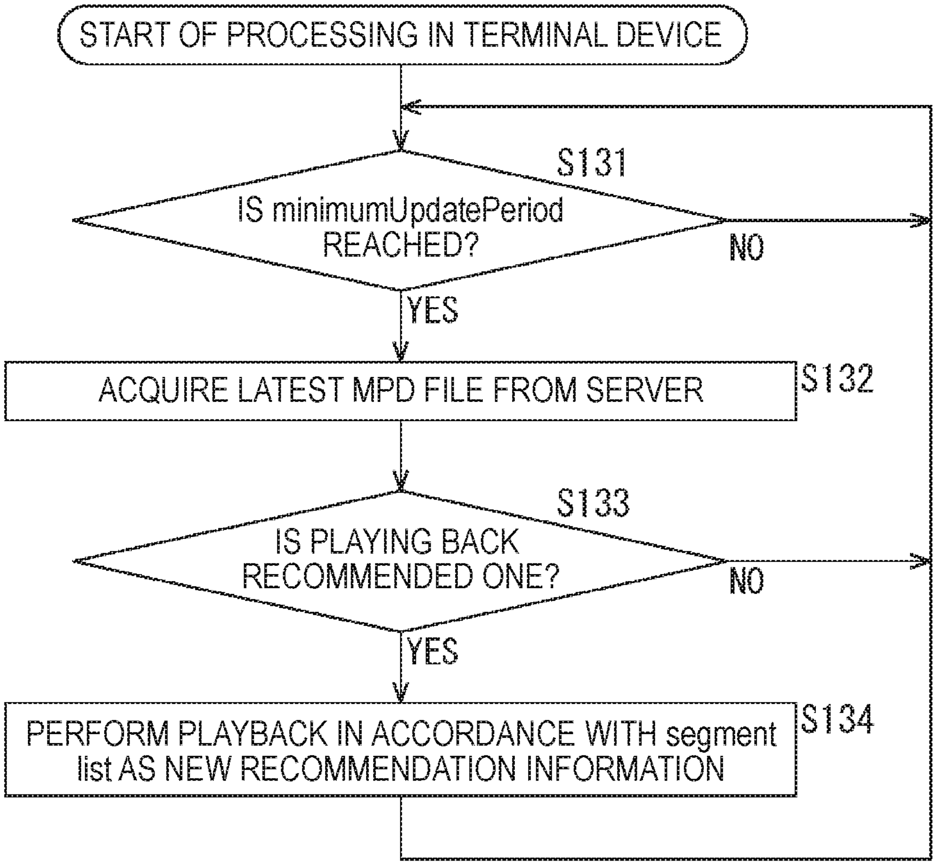
FIG. 33 is a flowchart illustrating processing in a terminal device.

An example of the MPD file in which the segment list is uploaded in step S114 of FIG. 32 is described with reference to FIGS. 34 and 35. FIG. 34 and subsequent FIG. 35 are diagrams illustrating examples of the MPD file.

In the last recommended AdaptationSet of FIG. 35, <Role schemeIdUri="urn:mpeg:dash:role:201X" value="recommend"/> is described. This Role descriptor indicates that this AdaptationSet relates to the recommendation information. Here, the segment list as recommendation information is described as follows.

```
SegmentList duration="2">
SegmentURL media="segment_b_1.mp4"/>
SegmentURL media="segment_c_2.mp4"/>
SegmentURL media="segment_a_3.mp4"/>
SegmentURL media="segment_a-4.mp4" />
SegmentURL media="segment_b_5.mp4"/>
SegmentURL media="segment_b_6.mp4"/>
SegmentURL media="segment_d-7.mp4"/>
. . .
```

In other words, in this example, the regions C, C, A, A, B, B, and D are sequentially set as the interest regions as time elapses.

Representation id="5" bandwidth="10000" dependencyId="1, 2, 3, 4"> indicates that the four regions of Representation id=1, 2, 3, 4 are recommended.

MinimumUpdatePeriod="PT10S" indicates that the MPD is updated every ten seconds (step S111 in FIG. 32). Accordingly, the terminal device 23 acquires a new MPD file after the lapse of the time (steps S131 and S132 in FIG. 33). The content management server 21 updates the contents of the latest <SegmentList duration="2"> (step S113 in FIG. 32).

The ROI information is accumulated on the side of the content management server 21 by using the request information of the segment file corresponding to the ROI from the terminal device 23 to the CDN server 22 actually performed. Accordingly, the content management server 21 can construct the preference information without performing special communication for collecting the interest information between the terminal device 23 and the content management server 21.

The delivery areas can be identified from the arrangement of the DASH cache server 32 and the like. In addition, in the case of service, in a case where it is possible to acquire the information of the terminal device 23, it is also possible to construct data for each information such as age, gender, personal preference, or the like.

A third processing example in the case where the content management server 21 generates the recommendation information on the basis of the interest information and delivers it to the terminal device 23 is described. In one example, recommendation parameters are added between the CDN server 22 and the terminal device 23 in requesting the MPD file or in requesting the segment file, and the CDN server 22 voluntarily plays back the recommendation information by sending the recommended segments on the basis of the recommendation information generated by the content management server 21.

In the case of MPD file request, "RECCOMED" is added to the HTTP query at the time of MPD request by HTTP. The CND server 22 sequentially pushes the recommended segments.

In the case of a segment file request, "RECCOMED" is added to the HTTP query when requesting a segment file via HTTP. The CDN server 22 sequentially pushes the recommended segments. In one example, if the number, like 10 segments, is specified, only the number of segment files is pushed. In one example, in a case where bitrate is specified below a certain value or the like, the recommended segment of optimum bitrate is sequentially pushed in that range.

In this way, recommendation information of a region being noticed in the entire content is transmitted.

Moreover, many other possible modifications can be made from the present technology without departing from the spirit and scope of the technology.

<Description of Computer to Which Present Disclosure is Applied (FIG. 36)>

The series of processes described above can be executed by hardware, and can also be executed in software. In the case of executing the series of processes by software, a program forming the software is installed on a computer. Herein, the term computer includes a computer built into special-purpose hardware, a computer able to execute various functions by installing various programs thereon, such as a general-purpose personal computer, for example, and the like.

Figure 36:
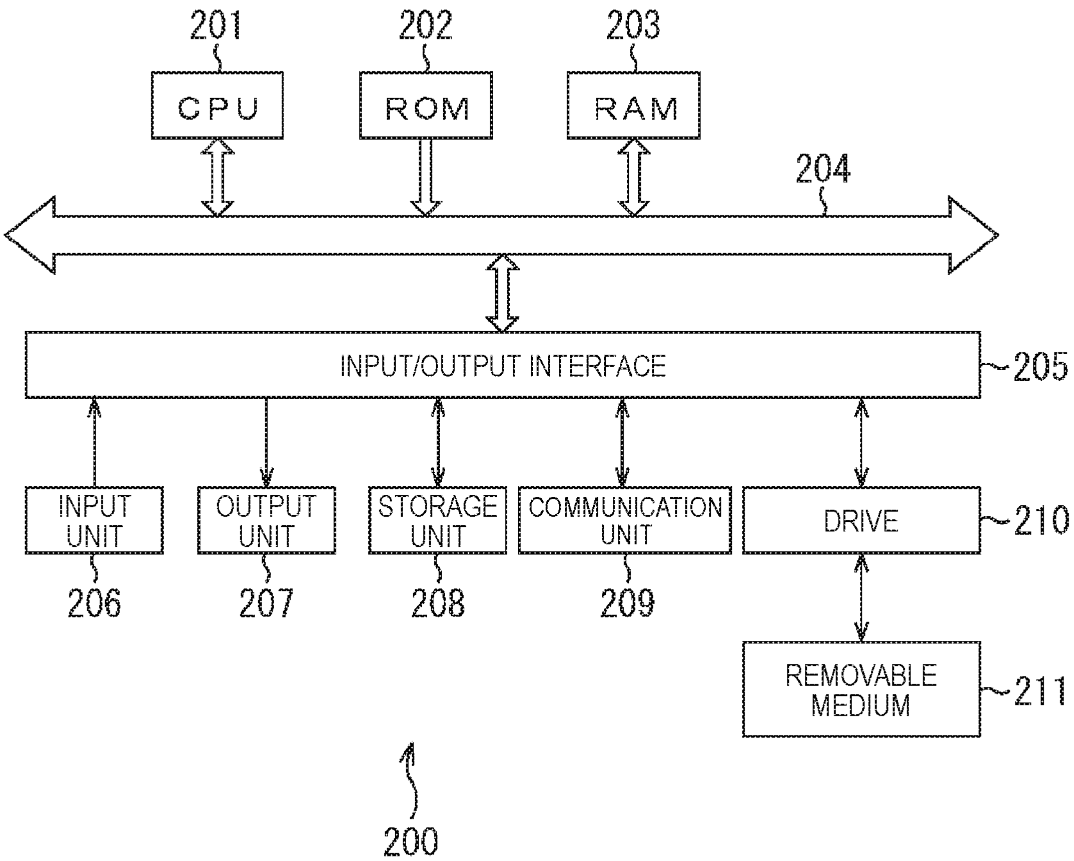
FIG. 36 is a block diagram illustrating a configuration example of computer hardware.

FIG. 36 is a block diagram illustrating an exemplary hardware configuration of a computer that executes the series of processes described above in accordance with a program.

In the computer 200, a central processing unit (CPU) 201, read-only memory (ROM) 202, and random access memory (RAM) 203 are interconnected through a bus 204.

Additionally, an input/output interface 205 is also connected to the bus 204. An input unit 206, an output unit 207, a storage unit 208, a communication unit 209, and a drive 210 are connected to the input/output interface 205.

The input unit 206 includes a keyboard, a mouse, a microphone, and the like. The output unit 207 includes a display, a speaker, and the like. The storage unit 208 includes a hard disk, non-volatile memory, and the like. The communication unit 209 includes a network interface, and the like. The drive 210 drives a removable medium 211 such as a magnetic disk, an optical disc, a magneto-optical disc, or semiconductor memory.

In the computer 200 configured as above, the series of processes described above are performed by having the CPU 201 load a program stored in the storage unit 208 into the RAM 203 via the input/output interface 205 and the bus 204, and execute the program, for example.

The program executed by the computer 200 (CPU 201) may be applied by being recorded onto the removable medium 211 as an instance of packaged media or the like, for example. In addition, the program may also be provided via a wired or wireless transmission medium such as a local area network, the Internet, or digital satellite broadcasting.

In the computer 200, by inserting the removable medium 211 into the drive 210, the program can be installed in the storage unit 208 via the input/output interface 205. Further, the program can be received by the communication unit 209 via a wired or wireless transmission medium and can be installed in the storage unit 208. Moreover, the program can be installed in advance in the ROM 202 or the storage unit 208.

Moreover, it should be noted that the program executed by the computer 200 may be a program that is processed in time series according to the sequence described in this specification or a program that is processed in parallel or at necessary timing such as upon calling.

In the present disclosure, a system has the meaning of a set of a plurality of configured elements (such as an apparatus or a module (part)), and does not take into account whether or not all the configured elements are in the same casing. Therefore, the system may be either a plurality of apparatuses, stored in separate casings and connected through a network, or a plurality of modules within a single casing.

The advantageous effects described in the present specification are merely examples and are not limitative, and other advantageous effects may be achieved.

An embodiment of the disclosure is not limited to the embodiments described above, and various changes and modifications may be made without departing from the scope of the disclosure.

In one example, in the push-media-adapted command, a range of attribute other than the encoding bitrate may be specified.

Additionally, the present technology may also be configured as below.

Moreover, in the present specification, the step of describing the program recorded on the recording medium is not limited to processing performed chronologically in the order described, but also includes processing to be executed not in parallel or individually even if it is not necessarily processed chronologically.

Moreover, in the present specification, the system represents the whole apparatus including a plurality of apparatuses.

<Other>

Additionally, the present technology may also be configured as below.

(1)

An information processing apparatus for managing content to be delivered to a plurality of other information processing apparatuses via a network, the information processing apparatus including:

an acquisition unit configured to acquire content information of the content delivered in response to a request to a plurality of the other information processing apparatuses; and a construction unit configured to construct interest information of a plurality of the other information processing apparatuses on the basis of the acquired content information.

(2)

The information processing apparatus according to (1), in which the content information is segment file information of a segment obtained by temporally segmenting the content.

(3)

The information processing apparatus according to (1) or (2), in which the segment file information includes a URL of a relevant segment file and the number of times the segment file is delivered.

(4)

The information processing apparatus according to any one of (1) to (3), in which the interest information includes a time series of an interest region and the number of times the interest region is delivered.

(5)

The information processing apparatus according to any one of (1) to (4), in which the interest information is constructed for each area.

(6)

The information processing apparatus according to any one of (1) to (5), in which the segment file information is acquired at regular time intervals.

(7)

The information processing apparatus according to any one of (1) to (6), in which the interest region is described using DASH SRD standard.

(8)

The information processing apparatus according to any one of (1) to (7), in which recommendation information to be delivered to a plurality of the other information processing apparatuses is generated on the basis of the interest information.

(9)

The information processing apparatus according to any one of (1) to (8), in which the recommendation information is a time series of the interest region having a largest number of times of delivery.

(10)

The information processing apparatus according to any one of (1) to (9), in which the recommendation information is described in a timed metadata track.

(11)

The information processing apparatus according to any one of (1) to (10), in which the recommendation information is described in a segment list of an MPD file outputted from the information processing apparatus.

(12)

An information processing method executed by an information processing apparatus for managing content to be delivered to a plurality of other information processing apparatuses via a network, the information processing method including:

an acquisition step of acquiring content information of the content delivered in response to a request to a plurality of the other information processing apparatuses; and a construction step of constructing interest information of a plurality of the other information processing apparatuses on the basis of the acquired content information.

(13)

An information processing apparatus for managing content to be delivered to a plurality of other information processing apparatuses via a network, the information processing apparatus including:

an acquisition unit configured to acquire content information of the content delivered in response to a request to a plurality of the other information processing apparatuses;

a construction unit configured to construct interest information of a plurality of the other information processing apparatuses on the basis of the acquired content information; and a generation unit configured to generate recommendation information to be delivered to a plurality of the other information processing apparatuses on the basis of the interest information.

(14)

An information processing method executed by an information processing apparatus for managing content to be delivered to a plurality of other information processing apparatuses via a network, the information processing method including:

an acquisition step of acquiring content information of the content delivered in response to a request to a plurality of the other information processing apparatuses;

a construction step of constructing interest information of a plurality of the other information processing apparatuses on the basis of the acquired content information; and a generation step of generating recommendation information delivered to a plurality of the other information processing apparatuses on the basis of the interest information.

(15)

An information processing apparatus receiving delivery of content from another information processing apparatus via a network, the information processing apparatus including:

an acquisition unit configured to acquire, from the other information processing apparatus, recommendation information generated on the basis of content information of the content requested from the other information processing apparatus and delivered by the other information processing apparatus; and a playback unit configured to perform playback on the basis of the recommendation information.

(16)

An information processing method executed by an information processing apparatus receiving delivery of content from another information processing apparatus via a network, the information processing method including:

an acquisition step of acquiring, from the other information processing apparatus, recommendation information generated on the basis of content information of the content requested from the other information processing apparatus and delivered by the other information processing apparatus; and a playback step of performing playback on the basis of the recommendation information.

REFERENCE SIGNS LIST

11 delivery system
21 content management server
22 CDN server
23 terminal device
31 DASH origin server
32-1 to 32-3 DASH cache server
41 DASH client
42 display device
43 GUI/attitude-angle detection device

The invention claimed is:

1. A first information processing apparatus, comprising:

a central processing unit (CPU) configured to:

transmit, via a network, content to a plurality of second information processing apparatuses;

transmit a request to the plurality of second information processing apparatuses;

acquire content information of the content based on the request to the plurality of second information processing apparatuses, wherein the content information is segment file information of a segment file of the content, and the segment file information includes a number of times the segment file is transmitted by a second information processing apparatus of the plurality of second information processing apparatuses to a third information processing apparatus;

determine interest information of the third information processing apparatus based on the acquired content information; and control the third information processing apparatus based on the interest information.

2. The first information processing apparatus according to claim 1, wherein the segment file information is of a segment obtained by a segmenting operation on the content.

3. The first information processing apparatus according to claim 2, wherein the segment file information further includes a URL of the segment file.

4. The first information processing apparatus according to claim 1, wherein the interest information includes a time series of an interest region and a number of times the interest region is transmitted to the third information processing apparatus.

5. The first information processing apparatus according to claim 4, wherein the CPU is further configured to determine the interest information for each area of the interest region.

6. The first information processing apparatus according to claim 3, wherein the CPU is further configured to acquire the segment file information at regular time intervals.

7. The first information processing apparatus according to claim 4, wherein the interest region is based on a Dynamic Adaptive Streaming over HTTP (DASH) Spatial Relationship Description (SRD) standard.

8. The first information processing apparatus according to claim 4, wherein the CPU is further configured to:

generate recommendation information based on the interest information; and transmit the recommendation information to the plurality of second information processing apparatuses.

9. The first information processing apparatus according to claim 8, wherein the recommendation information corresponds to a time series of the interest region having a largest number of times of delivery.

10. The first information processing apparatus according to claim 9, wherein the recommendation information is in a timed metadata track.

11. The first information processing apparatus according to claim 9, wherein the CPU is further configured to output an MPD file, and the MPD file includes a segment list that includes the recommendation information.

12. An information processing method, comprising:

in a first information processing device:

transmitting, via a network, content to a plurality of second information processing apparatuses;

transmitting a request to the plurality of second information processing apparatuses;

acquiring content information of the content based on the request to the plurality of second information processing apparatuses, wherein the content information is segment file information of a segment file of the content, and the segment file information includes a number of times the segment file is transmitted by a second information processing apparatus of the plurality of second information processing apparatuses to a third information processing apparatus;

determining interest information of the third information processing apparatus based on the acquired content information; and controlling the third information processing apparatus based on the interest information.

13. A first information processing apparatus, comprising:

a central processing unit (CPU) configured to:

transmit, via a network, content to a plurality of second information processing apparatuses;

transmit a request to the plurality of second information processing apparatuses;

acquire content information of the content based on the request to the plurality of second information processing apparatuses, wherein the content information is segment file information of a segment file of the content, and the segment file information includes a number of times the segment file is transmitted by a second information processing apparatus of the plurality of second information processing apparatuses to a third information processing apparatus;

determine interest information of the third information processing apparatus based on the acquired content information;

generate recommendation information based on the interest information; and transmit the generated recommendation information to the third information processing apparatus.

14. An information processing method, comprising:

in a first information processing apparatus:

transmitting, via a network, content to a plurality of second information processing apparatuses;

transmitting a request to the plurality of second information processing apparatuses;

acquiring content information of the content based on the request to the plurality of second information processing apparatuses, wherein the content information is segment file information of a segment file of the content, and the segment file information includes a number of times the segment file is transmitted by a second information processing apparatus of the plurality of second information processing apparatuses to a third information processing apparatus;

determining interest information of the third information processing apparatus based on the acquired content information;

generating recommendation information based on the interest information; and transmitting the generated recommendation information to the third information processing apparatus.

15. A first information processing apparatus, comprising:

a central processing unit (CPU) configured to:

receive, via a network, content including a segment file from a second information processing apparatus;

acquire recommendation information from the second information processing apparatus, wherein the recommendation information is based on content information of the content, the content information is segment file information of the segment file of the content, and the segment file information includes a number of times the segment file is transmitted by the second information processing apparatus to the first information processing apparatus; and execute playback based on the recommendation information.

16. An information processing method, comprising:

in a first information processing apparatus:

receiving, via a network, content including a segment file from a second information processing apparatus;

acquiring recommendation information from the second information processing apparatus, wherein the recommendation information is based on content information of the content, the content information is segment file information of the segment file of the content, and the segment file information includes a number of times the segment file is transmitted by the second information processing apparatus to the first information processing apparatus; and execute playback based on the recommendation information.

* * * * *